(12) United States Patent
Herbolzheimer et al.

(10) Patent No.: US 10,773,570 B2
(45) Date of Patent: Sep. 15, 2020

(54) CONTROL SYSTEM FOR AIR-CONDITIONING A VEHICLE

(71) Applicant: Bayerische Motoren Werke Aktiengesellschaft, Munich (DE)

(72) Inventors: Robert Herbolzheimer, Groebenzell (DE); Oliver Horn, Munich (DE); Patrick Oswald, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 171 days.

(21) Appl. No.: 15/868,381

(22) Filed: Jan. 11, 2018

(65) Prior Publication Data

US 2018/0134123 A1 May 17, 2018

Related U.S. Application Data

(63) Continuation of application No. PCT/EP2016/070915, filed on Sep. 6, 2016.

(30) Foreign Application Priority Data

Sep. 30, 2015 (DE) .......................... 10 2015 218 825

(51) Int. Cl.
*B60H 1/32* (2006.01)
*B60H 1/00* (2006.01)
*F25B 13/00* (2006.01)

(52) U.S. Cl.
CPC ....... *B60H 1/3216* (2013.01); *B60H 1/00007* (2013.01); *B60H 1/00899* (2013.01);
(Continued)

(58) Field of Classification Search
CPC ............. B60H 1/3216; B60H 1/00007; B60H 1/3213; B60H 1/00899; B60H 2001/3285; B60H 2001/3272; B60H 2001/00928
See application file for complete search history.

(56) References Cited

U.S. PATENT DOCUMENTS 5,632,156 A    5/1997   Takeo et al.
2003/0192952 A1* 10/2003  Horn .................... B60H 1/3232
                                              236/10

(Continued)

FOREIGN PATENT DOCUMENTS

CN        104748438 A     7/2015
DE        100 13 717 A1   9/2000

(Continued)

OTHER PUBLICATIONS

International Search Report (PCT/ISA/210) issued in PCT Application No. PCT/EP2016/070915 dated Dec. 6, 2016 with English translation (six pages).

(Continued)

*Primary Examiner* — Kun Kai Ma
(74) *Attorney, Agent, or Firm* — Crowell & Moring LLP

(57) ABSTRACT

A control system method is disclosed for air-conditioning a vehicle by a heat pump system, wherein one of multiple operating modes is automatically set, depending on the air-conditioning requirement. The passenger space is cooled by an air-conditioning evaporator and/or is heated by a heating heat exchanger. The heating heat exchanger is arranged in a heating branch of a coolant circuit and is provided with heat via a heat pump. If cooling is required, the heating branch is opened and the heating pump is deactivated. If heating is required, the heating branch is closed and heat is fed to the heating heat exchanger via the heat pump. In order to remove heat from the heating branch, same is opened and a low-temperature cooler, the condenser and the heating heat exchanger are operated connected in series.

25 Claims, 4 Drawing Sheets

(52) U.S. Cl.
CPC ....... *B60H 1/3213* (2013.01); *B60H 1/32284* (2019.05); *F25B 13/00* (2013.01); *B60H 2001/00928* (2013.01); *B60H 2001/3272* (2013.01); *B60H 2001/3285* (2013.01)

(56) References Cited

U.S. PATENT DOCUMENTS

| | | | | |
|---|---|---|---|---|
| 2004/0060312 | A1* | 4/2004 | Horn | H01M 8/04014 62/244 |
| 2004/0074255 | A1* | 4/2004 | Goto | B60H 1/00428 62/498 |
| 2004/0123976 | A1* | 7/2004 | Horn | B60H 1/005 165/42 |
| 2005/0087333 | A1* | 4/2005 | Horn | B60H 1/00492 165/203 |
| 2005/0218135 | A1* | 10/2005 | Kraemer | B60H 1/22 219/202 |
| 2010/0012295 | A1* | 1/2010 | Nemesh | H01M 10/615 165/104.19 |
| 2012/0222438 | A1* | 9/2012 | Osaka | B60H 1/0073 62/126 |
| 2013/0299129 | A1* | 11/2013 | Osaka | B60H 1/0005 165/59 |
| 2014/0232308 | A1* | 8/2014 | Watanabe | H02P 27/047 318/400.02 |
| 2015/0210141 | A1* | 7/2015 | Ragazzi | B60H 1/00907 62/93 |
| 2015/0308719 | A1* | 10/2015 | Gebbie | B60H 1/00921 62/71 |
| 2016/0233801 | A1* | 8/2016 | Sakai | H02M 7/5395 |
| 2017/0008407 | A1* | 1/2017 | Porras | B60H 1/00278 |
| 2017/0054188 | A1* | 2/2017 | Blatchley | H01M 10/663 |
| 2017/0106725 | A1* | 4/2017 | Kim | B60H 1/00278 |
| 2017/0174038 | A1 | 6/2017 | Scheldel et al. | |
| 2018/0215234 | A1* | 8/2018 | Lott | F02B 37/16 |

FOREIGN PATENT DOCUMENTS

| | | |
|---|---|---|
| DE | 10 2013 206 630 A1 | 10/2014 |
| DE | 10 2014 217 960 A1 | 3/2016 |
| EP | 2 437 955 B1 | 4/2012 |
| JP | 3555187 B2 | 8/2004 |
| WO | WO 2010/139582 A1 | 12/2010 |

OTHER PUBLICATIONS

German-language Written Opinion (PCT/ISA/237) issued in PCT Application No. PCT/EP2016/070915 dated Dec. 6, 2016 (six pages).

German-language Search Report issued in counterpart German Application No. 10 2015 218 825.6 dated Jun. 10, 2016 with partial English translation (11 pages).

Cover page of EP 2 437 955 A1 published Apr. 11, 2012 (one page).

Chinese Office Action issued in Chinese application No. 201680041799.6 dated Jan. 3, 2020, with English translation (Fourteen (14) pages).

* cited by examiner

CONTROL SYSTEM FOR AIR-CONDITIONING A VEHICLE

CROSS REFERENCE TO RELATED APPLICATIONS

This application is a continuation of PCT International Application No. PCT/EP2016/070915, filed Sep. 6, 2016, which claims priority under 35 U.S.C. § 119 from German Patent Application No. 10 2015 218 825.6, filed Sep. 30, 2015, the entire disclosures of which are herein expressly incorporated by reference.

BACKGROUND AND SUMMARY OF THE INVENTION

The invention relates to a control system for the air-conditioning of a vehicle.

A control system for the air-conditioning of a vehicle normally serves for the situation-dependent cooling and/or heating of, for example, a vehicle component or the passenger compartment of the vehicle. Here, the air-conditioning is commonly performed by means of a heat pump system, which is controlled and/or regulated by the control system.

A heat pump system is described for example in the Applicant's unpublished application DE 10 2014 217 960.

In general, in electric vehicles or even hybrid vehicles, the problem arises whereby an internal combustion engine which produces heat continuously, and an associated high-temperature cooling circuit, are normally not provided, and the heat required for heating coolant for the purposes of heating the passenger compartment of the vehicle must be obtained from another source. The coolant heated in this way is however normally at too low a temperature level, such that it is often necessary for a heat pump system to be used in order to bring the coolant to an adequate temperature level. Expedient heat sources are in particular electrical power components, which are normally arranged in the coolant circuit, that is to say in particular a low-temperature circuit or even simply merely cooling circuit, for example an electric drive machine, that is to say an electric motor, or else electrical power components, such as for example inverters, DC converters, charging electronics or the like. Under some circumstances, utilization of waste heat of a high-voltage battery, that is to say of a battery for providing a supply of energy to the drive machine of the vehicle, is also possible.

The various heat sources must however typically each be separately incorporated, resulting in a complex circuit configuration. In particular from the aspect of interior compartment air-conditioning, it is normally the case that different operating states necessitate corresponding settings in which the heat is to be conducted in each case differently either into the passenger compartment and/or to the surroundings, which in turn necessitates a multiplicity of valves, in particular complex valves, and complex control and regulation. In particular in electric vehicles, this leads to a high level of outlay, because here, as described above, altogether less heat is available, the efficient distribution of which is then all the more critical.

The invention is therefore based on the object of specifying an improved control system for the air-conditioning of a vehicle, in particular of an electric or hybrid vehicle, which control system permits cooling and heating of a passenger compartment of the vehicle and, here, ensures the most efficient possible, most stable possible and quietest possible operation.

The object is achieved according to the invention by means of a control system in accordance with embodiments of the invention. It is in particular also the case that a method for operating a heat pump system is realized by means of the control system. The refinements and advantages mentioned in conjunction with the control system then also apply analogously to said method and to the heat pump system, and vice versa.

The control system serves for the air-conditioning of a vehicle, in particular of an electric or hybrid vehicle, and is for this purpose in particular combined with, that is to say preferably connected to, a heat pump system. This is to be understood in particular to mean that the control system manipulates and sets the heat pump system by means of a number of control elements. The heat pump system has in particular a number of components for the air-conditioning of the vehicle. Said components are then controlled and/or regulated by the control system and, in this context, are in particular control elements of the control system. In this context, the vehicle is air-conditioned by means of the control system by virtue of the control system controlling and/or regulating the heat pump system.

Here, an air-conditioning demand for a passenger compartment of the vehicle is addressed in that one of several operating modes is set in a manner dependent on the air-conditioning demand, that is to say a suitable one of several operating modes or else operating states is assumed. If the air-conditioning demand comprises a cooling demand or a dehumidification demand, the passenger compartment is cooled by means of an air-conditioning evaporator. If the air-conditioning demand comprises a heating demand, the passenger compartment is heated by means of a heating heat exchanger. Here, it is basically possible for both a heating demand and a cooling demand to be present simultaneously, in particular in the case of dehumidification.

The heating heat exchanger is arranged in a heating branch of a coolant circuit and is supplied with heat by means of a heat pump. Said heat pump has a chiller and a condenser, alternatively a gas cooler, which are both connected to a refrigeration circuit, wherein the chiller is arranged in a cooling branch of the coolant circuit and the condenser is arranged in the heating branch. In the case of a cooling demand without an additional heating demand, the heating branch is opened, the chiller of the heat pump is deactivated, and a cooling mode is realized, that is to say in particular set, in this way. In the case of a heating demand without an additional cooling demand, the heating branch is closed, heat is supplied to the heating heat exchanger by means of the condenser of the heat pump, by means of the cooling branch and/or by absorption of heat by means of the low-temperature cooler, and a heating mode is realized in this way. The heating mode and the cooling mode are in each case an operating mode. For the dissipation of heat from the heating branch, the latter is opened, and the low-temperature cooler, the condenser and the heating heat exchanger are operated in a manner connected in series.

The control system permits operation of the heat pump system in various operating modes for the optimum air-conditioning of the vehicle in a given situation, that is to say in the presence of a given air-conditioning demand. The various operating modes are set through control and/or regulation of the individual components of the heat pump system. Said components are in particular the heating branch, the air-conditioning evaporator and the heat pump. Here, the control system is not restricted to a manipulation of these components. Furthermore, here and below, the expression "control system" is also to be understood to mean a regulation system or control and regulation system, that is to say the control system is configured not exclusively for control but possibly also for regulation.

One advantage achieved with the invention consists in particular in that a heat pump system operated by means of the control system is operated in a particularly energy-efficient, robust and quiet manner.

Accordingly, the air-conditioning using the control system is particularly energy-efficient, robust and quiet. Here, the control system permits particular energy-efficient operation of the heat pump system in particular in that, in a given air-conditioning situation, which is characterized by various cooling and heating demands, a suitable operating mode is automatically set, wherein "setting of an operating mode" or "switching between the operating modes" is to be understood to mean that the controlled and regulated components are set by the control system in accordance with the circumstances and demands, whereby it is then the case overall that a particular operating mode is automatically set and realized at a given point in time. In other words: the setting of the components of the heat pump system by means of the control system automatically gives rise to a respective operating mode. A respective operating mode is then defined in particular by respective switching states of the individual controlled and/or regulated components, and is a consequence of the setting of said components. The operating mode thus arises as a result of the setting of the components, and not vice versa.

Furthermore, the individual components are controlled and/or regulated in a particularly efficient manner. The, as it were, flowing transitions between the various operating modes achieved overall through the special control and regulation of the individual components of the heat pump system then ensure particularly robust and stable operation, in particular without waiting times and disturbing noises during switching, that is to say upon the setting of a different operating mode. Particularly quiet operation is then realized in particular in that a reversal of the respective flow direction of the coolant in the coolant circuit and of the refrigerant in the refrigeration circuit is omitted. Furthermore, the number of switching valves is also considerably reduced in relation to conventional heat pump systems, such that the heat pump system is on the one hand particularly inexpensive, and on the other hand its acoustics during operation are also considerably improved, in particular owing to a reduced number of switching processes.

A further advantage achieved by means of the invention consists in particular in that, through the use of the control system, a special circuit configuration of the various components of the heat pump system is made possible, which leads to particularly efficient operation. Of significance here is in particular the series operation of the heating heat exchanger and of the condenser in the heating branch in combination with the series operation with respect to the low-temperature cooler. In this configuration, the heating heat exchanger is in particular permanently flowed through by coolant, which is heated by means of the condenser, such that a normally expensive switching valve for the diversion of the coolant to the heating heat exchanger is not required, and therefore such a switching valve is preferably also omitted. For the heating of the passenger compartment by means of the heating heat exchanger, the heating branch is normally shut off, and is in particular opened only if an excess of heat is present, that is to say if more heat is present in the coolant circuit than is required for the heating of the interior compartment. In this case, heat is additionally dissipated by virtue of coolant from the heating branch being conducted via the low-temperature cooler. If no excess of heat is present, the heating branch is operated in a shut-off manner, such that the dissipation of heat occurs exclusively at the heating heat exchanger for the purposes of heating the interior compartment.

Altogether, the behavior of the heat pump system is determined primarily by the air-conditioning demand, which for example comprises a specific user input by means of an operating element of the control system, and/or takes into consideration ambient conditions that are determined by means of suitable sensors of the control system, for example temperature sensors for measuring the outside temperature or the temperature in the interior compartment of the vehicle, the temperature of a high-voltage battery of the vehicle or at particular locations in the heat pump system. A further possibility consists in the air-conditioning demand on the heat pump control system being determined by a superordinate control system, for example an air-conditioning function logic. The control system described here is in this case then in particular a subsystem of the superordinate control system. Of particular importance is an air-conditioning demand relating to the passenger compartment, a heating demand from the user, an air-conditioning demand relating to the high-voltage battery in the case of an electric or hybrid vehicle, and the outside temperature as an expression of the weather and the ambient conditions. Here, automatic, optimum control and regulation of the individual components and of the entire heat pump system per se in accordance with demand is realized by means of suitable linking of the air-conditioning demand, in the form of predefined and/or determined parameters which describe the air-conditioning demand, with suitable control and regulation concepts for the manipulation of the heat pump system. Here, it is basically possible for the entire heat pump system to be regarded as part of the control system, though at least individual components of the heat pump system are a part of the control system.

The coolant circuit is in particular a cooling circuit in which a coolant, for example a water-glycol mixture, circulates. The coolant circuit suitably comprises multiple, in particular three, sections, which are connected to one another at two branching points. The low-temperature cooler is then arranged on the first section, and the second section comprises the heating branch, which is connected via a feed line and a return line to the first section, wherein the feed line and the return line are in this case in particular likewise parts of the second section. The third section is then the cooling branch for vehicle components. In particular, one of the branching points is arranged, as first branching point, downstream of the first section. The feed line of the heating branch and the cooling branch begin at said first branching point. Downstream of the two branches, the cooling branch and the return line of the heating branch are merged, and open jointly into the first section, at the other branching point as second branching point.

In the refrigeration circuit, there is arranged a compressor for compressing refrigerant, whereby said refrigerant is brought to a higher temperature level. Here, the compressor is arranged downstream of the air-conditioning evaporator and of the chiller and upstream of the condenser. The compressor is in particular a so-called electrical refrigerant compressor, referred to for short as EKMV. Depending on the refrigerant used, a condenser is to be understood very generally to mean a heat exchanger for releasing heat from the refrigeration circuit. Correspondingly, it is then for example the case that if $CO_2$, also referred to as R744, is used, a gas cooler is used instead of a conventional condenser. Furthermore, a valve is arranged in the refrigeration circuit upstream of the air-conditioning evaporator, which valve is closed during in particular purely heating mode, that is to say during exclusively heating mode, and which serves as an expansion element during cooling mode. The expansion element is preferably a particularly inexpensive thermal expansion valve, referred to for short as TxV.

A vehicle designed as an electric or hybrid vehicle generally has, for drive purposes, a high-voltage battery, which then likewise contributes to the air-conditioning demand and must for example be cooled or heated. In one possible embodiment, the high-voltage battery is then connected to the refrigeration circuit, that is to say the high-voltage battery is thermally connected by means of a high-voltage battery evaporator to the refrigeration circuit, for the release of heat to the refrigeration circuit.

Said high-voltage battery evaporator is then expediently connected in parallel with respect to the chiller in the refrigeration circuit, and in this way serves as an additional or alternative heat source in the refrigeration circuit in the case of a cooling demand relating to the high-voltage battery. In particular in the case of a cooling demand on the high-voltage battery, that is to say in the case of a high-voltage battery cooling demand and a heating demand, it is the case in an advantageous embodiment that, firstly, an activation of the chiller is omitted, and instead, waste heat of the high-voltage battery is conducted by means of the condenser to the heating heat exchanger. An expansion element, preferably an inexpensive thermal expansion valve, that is to say a TxV, is connected upstream of the high-voltage battery evaporator. However, a variant is also conceivable in which the high-voltage battery is cooled by coolant, that is to say is connected to the coolant circuit, in particular to the cooling branch.

The condenser of the heat pump is formed in particular as a water-cooled condenser and has a refrigerant condenser and a condenser heat exchanger, which are thermally coupled to one another. Here, the refrigerant condenser is connected to the refrigeration circuit, and the condenser heat exchanger is connected to the coolant circuit. The chiller has a refrigerant evaporator and a chiller heat exchanger, which are thermally coupled to one another, wherein the refrigerant evaporator is connected to the refrigeration circuit, and the chiller heat exchanger is connected to the coolant circuit.

The heat pump expediently extracts heat by means of the low-temperature cooler from the surroundings of the vehicle and/or from the vehicle component from the cooling branch. For this purpose, the low-temperature cooler, the at least one vehicle component and the chiller are in particular connected in series with one another, wherein the chiller is preferably arranged downstream of the vehicle components to be cooled and in the spatial vicinity thereof in order to achieve the most efficient possible transfer of heat from the vehicle component to be cooled to the chiller. The vehicle component is for example a set of power electronics, an electric motor for driving the vehicle, or a high-voltage battery for energy supply purposes. A respective vehicle component to be cooled is normally thermally coupled to the coolant circuit by means of a suitable heat exchanger in order to release heat to the coolant.

Below, as advantageous embodiments, various control and regulation concepts for different components of the heat system will be described, for the purposes of automatically and continuously switching said heat system between the various operating modes, that is to say realizing a suitable operating mode in accordance with demand. Here, the individual concepts are in the first instance advantageous in each case individually, and are therefore considered as being inventive independently of one another. However, the combination of several of the various concepts yields at least one additional advantage in particular through the fact that the different concepts partially use the same reference, manipulated, control and/or regulating variables, and in this way form a particularly efficient overall concept for the control and regulation of the heat pump system.

Basically, for the air-conditioning in different situations with correspondingly different air-conditioning demands, at least a cooling mode, also referred to as summer mode, and a heating mode, also referred to as winter mode, are automatically set. Here, "automatic" is to be understood in particular to mean that the setting is performed directly and primarily in a manner dependent on a specific air-conditioning demand. Furthermore, it is preferably additionally the case that a number of mixed modes as transition modes between cooling mode and heating mode are available, that is to say, in addition to the cooling mode and heating mode, the heat pump system is then also operable in a number of mixed modes, and is also operated in said mixed modes in accordance with the air-conditioning demand.

The cooling mode arises in particular when a pure, that is to say exclusive, cooling demand is addressed, that is to say heat is absorbed only by means of the air-conditioning evaporator. In one variant, heat is additionally, or in particular alternatively, absorbed by means of the high-voltage battery evaporator. Here, the heat pump is deactivated, and the heating branch is opened, such that coolant is conducted out of the heating branch and in particular also out of the cooling branch via the low-temperature cooler. Furthermore, coolant that has been cooled, in particular to approximately ambient temperature, by means of the low-temperature cooler flows constantly through the heating branch. No heat is released by means of the heating heat exchanger. The latter is in particular arranged in an air-conditioning unit, and is flowed through by an airflow which, in the cooling mode, is expediently interrupted, for example by means of an air-conditioning unit controller which is superordinate or parallel to the control system. In other words: in the absence of a heating demand, the heating heat exchanger is shut off at the air side.

In the heating mode, it is in particular the case that exclusively a heating demand is addressed, by virtue of heat being released by means of the heating heat exchanger to the air flow flowing through it. For this purpose, heat is supplied to the heating heat exchanger by means of the condenser of the heat pump, which heat originally passes into the coolant circuit by means of heat absorption by means of the low-temperature cooler and/or a vehicle component to be cooled, and which heat is transferred from there by means of the chiller to the condenser. If a cooling demand is present for a high-voltage battery which is connected to the refrigeration circuit, then it is alternatively expediently the case that heat is introduced into the refrigeration circuit by means of the high-voltage battery evaporator, such that the chiller is not imperatively required and is then suitably deactivated. Furthermore, in the heating mode, the heating branch is closed in order that as much heat as possible is kept therein. The air-conditioning evaporator is in this case deactivated, such that no heat is absorbed by means thereof.

Then, in the mixed modes, in each case combined heating and cooling is realized, wherein different mixed modes differ in particular by a changed ratio of cooling demand to heating demand.

In a preferred embodiment, proceeding from the heating mode, a first mixed mode is automatically set by virtue of the air-conditioning evaporator being activated, that is to say switched in, for the purposes of simultaneously heating and cooling. Proceeding from the first mixed mode, a second mixed mode is then required and therefore also automatically set, if the heating power becomes lower, by virtue of the power of the chiller and thus of the heat pump being reduced. For this purpose, an expansion valve which is connected upstream of the chiller in the refrigeration circuit is throttled down. Here, "throttled down" is to be understood in particular to mean that, in addition to an in particular conventional regulation that is possibly present, throttling-down and thus a further reduction of the power of the heat pump are performed. Proceeding from the second mixed mode, a third mixed mode is automatically set by virtue of the heating branch being operated in clocked fashion, in order in particular to dissipate excess heat from the heating branch. Then, proceeding from the third mixed mode, the cooling mode is automatically set by virtue of the heating branch being permanently opened. The automatic setting in the reverse direction, that is to say from the cooling mode to the third mixed mode to the second mixed mode to the first mixed mode and finally to the heating mode, is performed analogously in a reversed manner. The setting of the various operating modes is thus altogether performed advantageously in an automatic, flowing and continuous manner.

Of the abovementioned operating modes, it is generally the case that only ever one is active, that is to say, at a given point in time, only ever one particular operating mode is set. This is in particular owing to the fact that the operating modes are defined significantly by the respective specific setting of the heating branch and of the expansion valve upstream of the chiller, and are therefore mutually exclusive.

In the refrigeration circuit there is arranged a compressor which is operated with a particular compressor rotational speed and which, in a manner dependent on exactly this speed, has a particular power. In a preferred embodiment, the control system has a first and a second regulator, by means of which the compressor, more specifically the power thereof, is regulated through setting, that is to say regulation, of the compressor rotational speed, which serves in each case as a control variable for both regulators, wherein only one of the two regulators and the control variable thereof are selected, in a manner dependent on the air-conditioning demand, for the regulation of the compressor. The compressor is thus in particular a control element of the control system. The compressor rotational speed significantly determines the power imparted by the compressor, and thus indirectly a respective air-conditioning power of the air-conditioning evaporator and of the heat pump. The compressor is regulated by means of a first and a second regulator, of which only one is used at a given point in time. In other words: the regulators are not simultaneously active, it rather being the case that only one of the regulators is selected and then used in a manner dependent on the present air-conditioning demand. As a result, the control system reacts automatically to changing ambient conditions, for example to a changed heating demand from the user. The two regulators are in this case configured and optimized for correspondingly different air-conditioning demands. In particular, the regulator used is then also selected in a manner dependent on the operating mode that is currently present.

In the heating mode, regulation is expediently performed by means of the first regulator, wherein then, a heating branch actual temperature, that is to say a temperature of the coolant in the heating branch or in the heating loop, is suitably used as regulating variable. The heating branch actual temperature is preferably measured between the condenser and the heating heat exchanger. The temperature of the coolant at this location determines the heating power of the heating heat exchanger and thus the heating of the passenger compartment, in particular in combination with the set air throughput and the inlet temperature of the air flow into the heating heat exchanger. To achieve a particular temperature of the passenger compartment, which is set for example by the user by means of an operating element, it is then necessary for the coolant at the heating heat exchanger to have a particular heating branch setpoint temperature, which is used as reference variable for the first regulator and which is predefined to the control system for example by a superordinate air-conditioning function logic. Correspondingly, the first regulator is then also referred to as heating regulator.

In the presence of a cooling demand, that is to say if a cooling mode or one of the mixed modes is set, in other words in those operating modes in which the air-conditioning evaporator is active and is used for the absorption of heat, the compressor is by contrast advantageously regulated by means of the second regulator in a manner dependent on an evaporator actual temperature as a regulating variable, that is to say in particular the temperature prevailing at the air-conditioning evaporator. This temperature is determined for example through measurement of an air temperature, that is to say the temperature of the air which flows over the air-conditioning evaporator for the purposes of cooling and which is caused to flow into the passenger compartment for the purposes of air-conditioning. In one possible embodiment, the air temperature corresponds to the evaporator actual temperature and is used directly as a regulating variable. As a reference variable, use is made of an evaporator setpoint temperature which analogously represents a target temperature at the air-conditioning evaporator or a target temperature for the air, and which is for example set by the user or predefined by means of a superordinate air-conditioning function logic. The second regulator is correspondingly also referred to as cooling regulator.

In the case of the regulation by means of the second regulator, it must be observed in particular that, specifically also in the mixed modes, in which a heating demand in the form of the heating branch setpoint temperature is also present at the same time as a cooling demand in the form of the evaporator setpoint temperature, the compressor is nevertheless regulated in a manner dependent on the cooling demand by means of the second regulator. The compressor is regulated by means of the first regulator only in the heating mode. In this way, efficient and in particular stable regulation of the compressor and of the heat pump system is ensured in particular in all operating modes. The two regulators are for example each formed as PI regulators.

In a further preferred embodiment, the control system has a third regulator by means of which the compressor is regulated by virtue of the third regulator being supplied with a coolant actual temperature as a regulating variable and a minimum coolant temperature as a reference variable. The third regulator is operated in particular in parallel, that is to say here in particular simultaneously, with the first regulator. The compressor is then regulated in a manner dependent on the coolant actual temperature, that is to say a temperature of the coolant outside the heating branch and the heating loop and in particular a temperature of the coolant downstream of the chiller and upstream of the low-temperature cooler. In this way, an additional regulating loop is advantageously formed, by means of which icing of the low-temperature cooler, owing to coolant that has been excessively cooled in the chiller, is efficiently avoided by virtue of the compressor rotational speed being reduced in good time. For this purpose, the minimum coolant temperature is in particular a lower limit value which should not be undershot in order to avoid icing. Therefore, the third regulator is also referred to as limitation regulator.

The first and the third regulator are preferably different regulators, wherein, as described above, the first regulator regulates to the heating circuit setpoint temperature and the third regulator regulates to the minimum coolant temperature. The first and the third regulator each generate a control variable, one of which is selected by the control system in a preferred embodiment. Here, the first regulator generates an operating control variable and the third regulator generates a limitation control variable. That one of the two control variables that has been selected, specifically the control variable of the first regulator or that of the third regulator, is then used for the regulation of the compressor. For this purpose, the control variable is selected by means of a comparator, wherein the comparator performs a minimum comparison and selects the lower of the two control variables.

In an embodiment with three regulators, these are then advantageously interconnected such that the compressor is firstly, in a manner dependent on the set operating mode, regulated basically by means of the heating or the cooling regulator, and at the same time, in the case of regulation by means of the heating regulator in the heating mode, prevention of icing of the low-temperature cooler is ensured in that, in the presence of an excessively high compressor power, the third regulator, that is to say the limitation regulator, is automatically used instead of the heating regulator. Altogether, therefore, an operating-mode-based selection is made between the first regulator and the second regulator, and in the case of the first regulator being selected, an additional limitation is performed by means of the comparator and the third regulator.

In an expedient variant, the compressor rotational speed is additionally limited by virtue of the control variable used for the regulation being multiplied by a limitation factor. The limitation factor is selected in particular by means of a characteristic curve in a manner dependent on a limitation variable. The limitation factor is in particular dependent on a limit value for a thermodynamic characteristic variable of the refrigerant, and for example a pressure or a temperature. By means of multiplication by the limitation factor, the pressure is then advantageously prevented from falling below a minimum low pressure upstream of the compressor or exceeding a maximum high pressure downstream of the compressor, and the temperature is prevented from exceeding a maximum hot-gas temperature of the refrigerant downstream of the compressor. In other words: the limitation factor ensures that certain limit values for characteristic variables of the refrigerant, for example the abovementioned parameters, are adhered to during the operation of the heat pump system. In one variant, it is correspondingly the case that multiple characteristic variables are monitored, and from these, multiple limitation factors or one common limitation factor are/is determined, which are/is then multiplied by the control variable.

In another preferred embodiment, the control system has a superheating regulator, also referred to as fourth regulator, by means of which a degree of superheating of the refrigerant is set through regulation of the expansion valve which is arranged upstream of the chiller and which has an opening which serves as a manipulated variable of the fourth regulator. Here, the degree of superheating serves as a regulating variable of the fourth regulator, and a setpoint degree of superheating, which is determined in a manner dependent on the air-conditioning demand, serves as a reference variable. Through the regulation of the expansion valve, a certain degree of superheating of the refrigerant upstream of the compressor, and thus ultimately the power of the heat pump, that is to say the amount of heat transferred by the heat pump from the refrigeration circuit into the heating branch, are accordingly set. The expansion valve is in this case in particular a control element of the control system.

The expressions first, second, third and fourth regulator are intended merely to provide a distinction in the naming of the regulators. Here, the use of the expression "fourth regulator" specifically does not mean that three further regulators also exist in all cases. Rather, an embodiment is in particular also possible in which only the fourth regulator is provided, but the other regulators mentioned above are replaced by other mechanisms. This applies analogously to the first, second and third regulators.

The degree of superheating corresponds to a difference between a refrigerant actual temperature upstream of the compressor and a pressure-dependent saturated steam temperature of the refrigerant. The degree of superheating is normally specified in Kelvin, and optimally amounts to between 2 and 15 K. In a suitable embodiment, for the determination of the degree of superheating, the temperature and the pressure of the refrigerant upstream of the compressor are measured, and the degree of superheating, that is to say the actual degree of superheating, is determined from this, in particular by means of a characteristic curve. To then avoid an excessively frequent adjustment of the expansion valve by means of the fourth regulator, it is the case in an expedient refinement that rapid changes in temperature are absorbed by virtue of the measured temperature being temporally filtered, that is to say smoothed, whereby in particular the inertia of a TxV, that is to say of a thermal expansion valve, is simulated.

The regulation of the expansion valve and the setting of the degree of superheating are performed by means of the fourth regulator, that is to say the superheating regulator. The setpoint degree of superheating as the reference variable is preferably determined by means of a characteristic curve in a manner dependent on the present air-conditioning demand. However, a constant value is also basically suitable. By contrast to this, however, an adaptation of the degree of superheating is advantageous in particular for the purposes of increasing efficiency and for the purposes of avoiding an electrical auxiliary heater, such as is required in the event of a heating power deficit, in the heating branch for the first mixed mode. For this purpose, in a suitable embodiment, the air-conditioning evaporator and the chiller are trimmed with one another and a setpoint degree of superheating is set which is lower than for the heating mode. Here, the air-conditioning evaporator is activated, that is to say no pure heating mode, but possibly a mixed mode, is set. In particular because, outside the heating mode, the compressor, as described above, is regulated basically by means of the difference between the evaporator actual temperature and the evaporator setpoint temperature, the power of the compressor is correspondingly split between the air-conditioning evaporator and the heat pump, such that, in particular in the first mixed mode, under some circumstances, the demanded amount of heat does not pass into the heating branch, and additional heating must be imparted for example by means of an additional auxiliary heater. To avoid this as far as possible, it is then expediently the case that a lower setpoint degree of superheating is set, that is to say the opening of the expansion valve upstream of the chiller is set to a correspondingly greater value, and thus a greater refrigerant mass flow through the chiller is generated, whereas a reduced refrigerant mass flow passes through the air-conditioning evaporator. Owing to the regulation of the compressor relative to the air-conditioning evaporator, it is then the case that the power of the compressor automatically is increased, such that in turn, it is also the case that more heat is transferred by means of the heat pump into the heating branch. By means of this adaptation of the setpoint degree of superheating in a manner dependent on the air-conditioning demand, that is to say ultimately in particular in a manner dependent on the operating mode, it is then the case in particular in the first mixed mode that advantageous trimming of the air-conditioning evaporator and of the chiller is realized, and a higher compressor power is forced in relation to that which would initially be required solely on the basis of the evaporator actual temperature. Said additional compressor power is then used for the additional supply of heat into the heating branch by means of the heat pump, such that an auxiliary heater, which is inefficient in comparison to this, does not need to be activated. This furthermore yields the advantage that an auxiliary heater can then be omitted, whereby costs in turn are saved.

In a particularly advantageous embodiment, the manipulated variable of the fourth regulator is influenced by an additional throttling-down factor, that is to say in particular is multiplied by said factor and thereby reduced, for the reduction of the amount of heat transferred by the heat pump. In other words: in addition to the regulation of the expansion valve by means of the fourth regulator, the expansion valve is throttled down further by means of the throttling-down factor. In this way, in particular, the second mixed mode is set, which is distinguished by the throttling-down by means of the throttling-down factor. The throttling-down factor is however basically in particular also involved in the definition of the various other operating modes. The throttling-down factor is suitably determined as a factor in the range from 0 to 1, wherein the second mixed mode is then set in situations in which the throttling-down factor is greater than 0 and less than 1. A throttling-down factor of 0 or 1 then marks a transition from the second mixed mode to another operating mode, in particular to the third mixed mode.

The throttling-down factor serves, as described above, primarily for realizing an additional reduction of the amount of heat that is transferred by the heat pump, and thus for realizing the second mixed mode. Since, in said second mixed mode, in comparison with the heating mode and in particular also in comparison with the first mixed mode, only a relatively small amount of heat is required in the heating branch, the power of the heat pump is reduced as a result of the throttling-down of the expansion valve, and it is thus then the case that less heat is transferred from the refrigeration circuit into the heating branch, because less heat is absorbed from the coolant circuit. As a result, an unnecessarily large amount of heat, which does not correspond to demand, in the heating branch is avoided, and the efficiency of the heat pump system is improved overall.

The throttling-down factor is suitably determined in a manner dependent on a temperature of the coolant in the heating branch, that is to say in a manner dependent on the heating branch actual temperature already mentioned above, more specifically in a manner dependent on the difference between the heating branch setpoint temperature and the heating branch actual temperature. Here, the difference for determining a suitable value of the throttling-down factor is expediently determined on the basis of a characteristic curve. This curve runs in particular such that, with increasing heating branch actual temperature, which then already lies above the heating branch setpoint temperature, the throttling-down factor is selected to be lower, such that the expansion valve is closed to a greater extent, and here, the power of the chiller is advantageously reduced exactly to the required extent.

In fact, the throttling-down effect that is of importance here, that is to say the reduction of the absorption of heat in the second mixed mode, can advantageously also be achieved by means of a changed specification of the setpoint degree of superheating, specifically through specification of a setpoint degree of superheating which is greater than the actually desired setpoint degree of superheating. In particular, instead of an explicit throttling-down factor as described above, it is then the case in a suitable variant that a reduction of the absorption of heat is achieved in that the setpoint degree of superheating is modified with an additional throttling-down supplement, that is to say in particular that the throttling-down supplement is added to the setpoint degree of superheating, in order to obtain a greater setpoint degree of superheating. This throttling-down supplement is for example a fixed value, or is obtained from a characteristic curve. Alternatively, for the setpoint degree of superheating, a different characteristic curve is used, in which the throttling-down supplement is already taken into consideration.

By means of this additional intervention into the regulation of the expansion valve by means of the fourth regulator, the degree of superheating is also increased, which in this situation should however be suitably accepted. For this purpose, in an expedient embodiment, in the case of a reduction of the control variable by means of the throttling-down factor, that is to say in the second mixed mode and in particular in the case of a throttling-down factor of less than 1, an I component of the fourth regulator is stopped, wherein the fourth regulator is in particular formed as a PI regulator. In one variant, the P component is also stopped. As a result of the stoppage, that is to say deactivation, of the I component and possibly also of the P component, the regulator is advantageously prevented from counteracting the additional intervention by means of the throttling-down factor.

In the throttling-down factor and in particular in the characteristic curve for the throttling-down factor, it is expediently taken into consideration that a maximum heating branch temperature should not be exceeded, that is to say the throttling-down factor amounts to 0 before or at the latest when the heating branch actual temperature reaches the maximum heating branch temperature. In other words: the characteristic curve for the throttling-down factor is expediently configured such that a maximum heating branch temperature is not overshot. In this way, a transfer of heat by means of the heat pump is then prevented when the maximum heating branch temperature is reached.

In an advantageous embodiment, in the case of a limit value, that is to say a minimum or maximum value, and in particular the value 0, for the throttling-down factor being reached, the expansion valve is fully closed, and the third mixed mode is automatically set. By virtue of the fact that the expansion valve is closed, it is in particular also the case that the absorption of heat by the heat pump is deactivated. In particular, heat is then absorbed, and transferred into the heating branch, only by means of the air-conditioning evaporator. This setting is accordingly performed in the presence of a heating demand which is reduced in relation to the heating mode and the first and the second mixed modes, or if no heating demand whatsoever is present. To then easily and efficiently remove any excess heat from the heating branch, the third mixed mode is automatically set, and the heating branch is operated in clocked fashion. The transition between the second and third mixed modes is accordingly distinguished in particular by the fact that the power of the heat pump can be reduced no further, but nevertheless excess heat is present in the heating branch, such that the heating branch is now recurringly opened.

In situations in which the chiller is not active, that is to say in particular in the third mixed mode, it is then also expediently the case that an I component of the fourth regulator, which is formed in particular as a PI regulator, is stopped, in order to then, in particular in the event of a renewed activation of the chiller, prevent the fourth regulator from moving the expansion valve into a stop position, that is to say from directly fully opening said expansion valve. Instead, the expansion valve is then opened in a continuous or flowing manner proceeding from the closed position. In this way, in particular, unnecessary switching noises and an excessive acoustic burden on the surroundings are avoided.

In a preferred embodiment, upon the shut-down of the vehicle or if both the chiller and the air-conditioning evaporator are active, a minimum degree of opening is predefined for the expansion valve upstream of the chiller, which minimum degree of opening limits the manipulated variable of the fourth regulator. This embodiment is based on the consideration that, in certain situations, a complete closure of the expansion valve upstream of the chiller is disadvantageous, and therefore, specifically in such situations, the regulation of the expansion valve is expediently circumvented and, instead, a minimum degree of opening for the expansion valve is set by virtue of a minimum value being used as a lower limit value for the control variable. In particular, however, in the first and second mixed modes, owing to the throttling-down factor, the actually set opening may then undershoot the minimum degree of opening owing to the additional throttling-down action.

This approach is particularly expedient firstly upon the starting of the heat pump system, that is to say in particular upon the starting of the vehicle, such that the minimum degree of opening is expediently set already upon the shut-down of the vehicle in order to then be correspondingly set upon starting. Such an opened position in the case of an inactive heat pump system and generally inactive vehicle then permits an advantageous pressure equalization in the refrigeration circuit, such that noticeable pressure pulses and noises upon starting are avoided.

The specification of a minimum degree of opening is secondly also suitable in particular for the first mixed mode and generally for situations and operating modes in which, in addition to the expansion valve upstream of the chiller, the expansion valve upstream of the air-conditioning evaporator is also used and opened. In this situation, both expansion valves jointly influence the degree of superheating upstream of the compressor and, through specification of the minimum degree of opening, an excessive degree of closure of the expansion valve upstream of the chiller is then avoided. This then has a particularly stabilizing effect on the operation of the heat pump system.

In a further preferred embodiment, the control system closes and opens the heating branch by means of a shut-off valve which is arranged in particular in a feed line or a return line of the heating branch. In other words: the control system controls the shut-off valve. The shut-off valve is thus in particular a control element of the control system. For the opening of the heating branch, the shut-off valve is opened, and the cooling mode is set in a particularly simple manner in this way. For the closure of the heating branch, the shut-off valve is correspondingly closed, and the heating mode, the first mixed mode or the second mixed mode is thereby set. The three operating modes of heating mode, first mixed mode and second mixed mode then differ from one another by the respective setting for the heat pump and the air-conditioning evaporator. The third mixed mode is then set by virtue of the shut-off valve and thus also the heating branch being periodically opened and closed, that is to say operated in clocked fashion. The switching state of the shut-off valve thus defines in particular the transitions from the second mixed mode to the third mixed mode and from the latter to the cooling mode.

A continuous transition between different operating modes is realized in a particularly simple and efficient manner by means of the shut-off valve. In particular, the clocked actuation ensures a gradual adaptation of the dissipation of heat from the heating branch to the respective situation and to the present air-conditioning demand. For the cooling mode, the shut-off valve is permanently opened in order to realize a maximum exchange of coolant and a dissipation of heat from the heating branch via the low-temperature cooler, whereas, for the heating mode, the shut-off valve is permanently closed in order to keep as much heat as possible in the heating branch and in the heating loop. The shut-off valve is then permanently closed also for realizing the first and the second mixed mode, in which in each case only the heating power by means of the heat pump is reduced. Only in the event of an excessive accumulation of heat in the heating branch is the third mixed mode set and the shut-off valve operated in clocked fashion.

In a preferred control concept for the shut-off valve, that is to say in particular a concept for the automatic connection and separation of the heating branch to and from the rest of the coolant circuit in accordance with demand, the shut-off valve is actuated such that a clock signal is predefined for the repeated opening and closing of the shut-off valve, wherein the shut-off valve is opened during a first time interval and is subsequently closed during a second time interval. Here, the two time intervals added together yield a period duration of said clocked operation. The period duration amounts to for example 3.6 s, and the two time intervals then correspondingly have values between 0 and 3.6 s. The predefined clock signal is for example the ratio of the first time interval to the period duration.

The clock signal is suitably determined by means of a characteristic curve which links the clock signal to be set with the heating branch actual temperature, that is to say the temperature of the coolant in the heating branch. In particular, the clock signal is selected on the basis of a characteristic curve and in a manner dependent on the difference between the heating branch actual temperature and a maximum heating branch setpoint temperature. Said maximum heating branch setpoint temperature is in turn determined in particular in a manner dependent on the heating branch setpoint temperature by means of a suitable characteristic curve.

The shut-off valve is thus overall preferably actuated in a manner dependent on the heating branch setpoint temperature, which is in particular predefined by the user, and in particular in a manner dependent on the excess of heat in relation to the heating branch setpoint temperature, and said control is limited by means of a maximum temperature for the heating branch. In the case of a low heating branch actual temperature, the shut-off valve is preferably held permanently closed by virtue of a clock signal of 0 being selected. In this way, heat is retained in the heating branch, and the heating mode, the first mixed mode or the second mixed mode is set. However, if the heating branch setpoint temperature is reached or exceeded, the shut-off valve is operated in clocked fashion by virtue of a clock signal between 0 and 1 being selected in order to dissipate excess heat from the heating branch. Accordingly, the third mixed mode is advantageously automatically set if more heat than is required is present in the heating branch.

In the event of a further increase of the heating branch actual temperature, the cooling mode is then automatically set, and the shut-off valve is permanently opened through the setting of a clock signal of 1, in order to ensure a maximum dissipation of heat from the heating branch. The control of the shut-off valve thus automatically sets the suitable clock signal and ensures a continuous transition between the operating modes, in particular between the operating modes with a heating demand, that is to say in this case the heating mode and the first and second mixed modes, and the operating modes with a low or negligible heating demand in relation thereto, that is to say the third mixed mode and the cooling mode. Of particular importance here for an optimum transition is correspondingly suitable parameterization, that is to say configuration, of the characteristic curves, for example through determination by means of a test series.

In a further preferred embodiment, the control system automatically sets a low-temperature heating configuration by virtue of the absorption of heat by the heat pump by means of the chiller being deactivated and waste heat of a vehicle component which is connected to the cooling branch being used for heating purposes. In the low-temperature heating configuration, therefore, an alternative supply of heat to the heating heat exchanger is realized, wherein the use of the absorption of heat by the heat pump by means of the chiller is omitted, and the heat is supplied directly via the coolant circuit. Here, the absorption of heat by the heat pump by means of the chiller is deactivated in particular by virtue of the expansion valve upstream of the chiller being closed. This embodiment is based on the realization that, in certain situations, utilization of the waste heat of the vehicle component is possible without the use of the heat pump. If a demand for cooling of the passenger compartment however simultaneously still exists, heat continues to be absorbed into the refrigeration circuit by means of the air-conditioning evaporator, such that in this case the compressor remains activated. However, if no demand for cooling of the passenger compartment exists, the heat pump is suitably completely deactivated, that is to say the compressor is deactivated.

A situation in which utilization of the waste heat of the vehicle component is possible without the use of the heat pump is present in particular if the heating branch setpoint temperature is lower than the coolant actual temperature. An activation condition for the low-temperature heating configuration is then in particular that the heating branch setpoint temperature is also higher than the heating branch actual temperature, such that the low-temperature heating configuration is suitably activated in exactly said situation. If the low-temperature heating configuration is activated, the heating branch actual temperature may exceed the heating branch setpoint temperature. However, as long as the coolant actual temperature is high enough, that is to say is in particular higher than the heating branch setpoint temperature, the low-temperature heating configuration expediently remains activated. In other words: the low-temperature heating configuration is activated if a heating demand is present and the coolant downstream of the chiller is at a higher temperature than that in the heating branch, that is to say a suitable heat potential is present and the coolant can then release heat at the heating heat exchanger. The activation is however not performed if the coolant actual temperature lies below the heating branch actual temperature. This lower limitation of the activation serves in particular for preventing heat from being unnecessarily dissipated from the heating branch in the event of a change in the heating demand from the user toward a reduced heating demand, whereby the efficiency of the heat pump system is in turn improved.

In the low-temperature heating configuration, the heat pump system is set, in particular with regard to the various valves, in the same way as in the cooling mode, that is to say with a closed expansion valve upstream of the chiller and with an open heating branch. The expansion valve upstream of the chiller is fully closed, because the heat used for heating purposes is extracted from the cooling branch and the absorption of heat by the heat pump by means of the chiller is not required. The special feature consists in particular in that said setting of the valves, which is indeed otherwise present only in the cooling mode, is also set even though there is no demand for cooling of the passenger compartment.

A dissipation of excess heat to the surroundings is basically performed by means of the low-temperature cooler. To nevertheless as far as possible avoid an unnecessary dissipation of heat to the surroundings, it is the case in a further preferred embodiment that the control system sets a heat store configuration in order to prevent a release of heat to the surroundings. For this purpose, the coolant is conducted past the low-temperature cooler via a low-temperature cooler bypass, that is to say in particular the low-temperature cooler bypass is connected in parallel with respect to the low-temperature cooler. Furthermore, a bypass valve is suitably arranged in the low-temperature cooler bypass, which bypass valve is opened in order to set the heat store configuration and is correspondingly closed for the purposes of deactivation. The setting of said bypass valve thus defines the heat store mode. The bypass valve is furthermore in particular a control element of the control system.

In a particularly inexpensive embodiment, the bypass valve is a shut-off valve which is then arranged along the low-temperature cooler bypass. In a particularly efficient refinement, a further low-temperature shut-off valve is additionally arranged for the purposes of shutting off the low-temperature cooler. Said low-temperature shut-off valve is then in particular operated inversely with respect to the bypass valve, such that the coolant is conducted either entirely via the low-temperature cooler or entirely via the low-temperature cooler bypass. In an alternative embodiment, a switching valve, in particular 3/2-way valve, is arranged in place of the two shut-off valves, specifically upstream or downstream of the low-temperature cooler, such that an activation and deactivation of the heat store mode is performed by switching of the switching valve.

In a suitable embodiment, the heat store configuration is automatically set exactly if the coolant actual temperature is higher than an outside temperature, that is to say a temperature in the surroundings of the vehicle, and if the coolant actual temperature is lower than a maximum, that is to say maximum permitted, coolant temperature. In this situation, that is to say if the coolant actual temperature is higher than the outside temperature, it would at least potentially be possible for heat to be released to the surroundings, but this is prevented through activation of the heat store configuration. The limitation by the maximum coolant temperature then protects the coolant circuit and the components connected thereto, such as for example the power electronics or the electric drivetrain, against overheating as a result of excessive heating of the coolant.

The heat store configuration is thus in particular activated only when, in the presence of certain ambient conditions, the heat contained in the coolant circuit should not be released to the surroundings but rather should be supplied to the heating branch by means of an absorption of heat by the chiller and a release of heat by means of the condenser. In other words: the heat should be retained in the coolant circuit, in particular even if there is no heating demand at the present point in time, but it is intended for the heat to be utilized at a later point in time. The ambient conditions are characterized by the outside temperature, the coolant actual temperature and the maximum coolant temperature. The heat store configuration is activated or deactivated in a manner dependent on these three temperatures. In particular, for this purpose, the shut-off valve is also opened in order to realize an inflow of the coolant into the heating branch.

In an advantageous embodiment, the heat store configuration is also automatically activated if more heat is generated in the cooling branch than is transferred into the refrigeration circuit by means of the chiller. In other words: if the heating demand is lower than a cooling demand on the heat source in the cooling branch, the heat store configuration is preventatively activated in order to retain the initially excess waste heat in the coolant circuit for possible future heating demands. Here, the amount of heat that is transferred by the chiller conforms to its maximum power and to the present heating demand. The available amount of heat conforms to the waste heat generated by the heat source, that is to say is dependent on the specific operating state of the heat source, and, in the case of the power electronics or the drivetrain of the vehicle, on the present driving mode or driving cycle in which the vehicle is being operated. Thus, if less heat is required than is available, the excess heat is expediently stored for later use, in particular at least for as long as the coolant actual temperature does not exceed a maximum coolant temperature, wherein the maximum coolant temperature does not imperatively correspond to the abovementioned maximum coolant temperature, but is alternatively a maximum cooling branch temperature.

The heat store configuration is advantageous in particular in combination with the abovementioned low-temperature heating configuration, because here, the waste heat of the vehicle component in the cooling branch should pass as completely as possible into the heating branch, and as far as possible no heat should be lost via the low-temperature cooler. Therefore, the heat store configuration is expediently automatically set when the low-temperature heating configuration is set.

The low-temperature cooler is assigned a fan, having an expediently adjustable fan rotational speed. The fan is preferably actuated by the control system by virtue of the fan rotational speed being set in a manner dependent on the coolant actual temperature and on a minimum coolant temperature. In this way, the exchange of heat by means of the low-temperature cooler, that is to say in particular with the surroundings, is advantageously set in accordance with demand and adapted to the respectively present situation, in particular to the temperature conditions in the cooling circuit. Here, the exchange of heat is determined primarily by means of an air flow across the low-temperature cooler, that is to say an air throughput or an amount of ambient air that is conducted across the low-temperature cooler per unit of time. The air throughput is then controlled by adjustment of the fan rotational speed. The fan is thus in particular a control element of the control system. The fan is in particular an electrically driven fan and is also referred to as an E-fan. The fan rotational speed is then a manipulated variable for a controller, with the coolant actual temperature as control variable.

The minimum coolant temperature indicates a lower limit value which prevents the coolant from being cooled at the low-temperature cooler to such an extent that the low-temperature cooler ices up. For this purpose, the minimum coolant temperature is determined for example by means of a characteristic curve in a manner dependent on the outside temperature, and in particular such that the minimum coolant temperature is at most insignificantly lower than the dew point of the ambient air in the present situation. Here, the minimum coolant temperature is normally lower than the outside temperature.

In a preferred refinement, the fan rotational speed is determined by means of a characteristic curve which is configured such that the fan rotational speed is increased if the coolant actual temperature approaches the minimum coolant temperature, that is to say in the case of a decreasing difference between the two temperatures, in order to prevent icing of the low-temperature cooler through heating of the coolant by means of an increase of the absorption of heat from the surroundings. Alternatively, and preferably in addition, the characteristic curve or an additional characteristic curve is configured such that a higher fan rotational speed is set in the case of the dissipation of heat by means of the low-temperature cooler and in the case of increasing coolant actual temperature, in order for the correspondingly hotter coolant to be cooled more intensely in the low-temperature cooler. It is preferable for both of the abovementioned alternatives to be realized and to be linked by means of a maximum selection. Then, in each case one fan rotational speed is determined from two characteristic curves, and the greater is selected such that, for a decreasing coolant actual temperature, icing of the low-temperature cooler is prevented by means of an increased absorption of heat from the surroundings, and in the case of an increasing coolant actual temperature, excessive heating of the coolant is prevented by means of an increased release of heat to the surroundings.

In the heat store mode, control of the fan is expediently omitted and said fan is then deactivated, because an exchange of heat with the surroundings is not desired in this case and, through deactivation of the fan, it is correspondingly the case that energy is saved both for the operation of the fan and as a result of the otherwise increased exchange of heat at the low-temperature cooler.

The air throughput at the low-temperature cooler is controlled in a manner adapted to demand by means of the above-described control concepts for the fan, and is thus particularly efficient. Only in the presence of corresponding demand is the fan rotational speed increased, and said fan rotational speed is otherwise kept as low as possible such that, overall, improved acoustics of the heat pump system are also realized.

The control system basically has a memory in which a number of model parameters are stored, in particular those temperatures which constitute critical limit temperatures of the coolant. One example of such a critical limit temperature, and thus of a model parameter, is the abovementioned minimum coolant temperature. This knowledge, in combination with a measurement of the coolant actual temperature, permits advantageously regular and in particular continuous monitoring of the coolant actual temperature with regard to a possible risk of icing as a result of a nearing of the minimum coolant temperature.

In a preferred embodiment, in particular potential icing is then prevented by virtue of the heating branch being cyclically opened and heat being conducted from the heating branch to the low-temperature cooler. In other words: the cooler is heated at regular time intervals by means of the heating branch in a manner dependent on the difference between the minimum coolant temperature and the coolant actual temperature. Here, in particular in a manner similar to the third mixed mode, by means of cyclic opening of the heating branch, heat is dissipated from the latter and, in this way, an icing prevention mode is set, that is to say protection against icing is realized. Here, cyclic opening is to be understood to mean that the heating branch is not operated in clocked fashion as in the third mixed mode, but rather the heating branch is basically closed for a relatively long time period of several minutes, in particular at least 10 minutes, and is opened only for a short time period of a few seconds, for example 1 to 10 seconds, in particular up to 60 seconds. In this way, it is then the case that, during the short time period, heat is released from the heating branch into the rest of the coolant circuit, and conducted to the low-temperature cooler, without the operating mode that is actually desired being significantly interrupted. In other words: in a manner dependent on the coolant actual temperature, a cyclic deicing mode is realized and set by virtue of the heating branch being briefly opened proceeding from a currently present operating mode, in particular one with a closed heating branch. The icing prevention mode briefly interrupts, so to speak, a respectively set operating mode. Through suitable configuration of the control system, the cyclic icing prevention mode is then activated such that icing does not occur in the first place. This is suitable in particular for vehicles with artificially generated additional waste heat in the coolant circuit, wherein then, through corresponding generation of such additional waste heat, the temperature of the coolant in the coolant circuit is increased overall, for example by a few ° C., such that icing at the low-temperature cooler correspondingly does not occur in the first place.

In the above-described control and regulation concepts for the various components, the various characteristic curves by means of which, firstly, further parameters for the respective control or regulation are determined and, secondly, a reference to the various control variables is produced are of particular significance. Specifically, said characteristic curves significantly determine the specific behavior of the control system and the automatic setting, performed by said control system, of the various operating modes, in particular the conditions for the transitions. Furthermore, it is advantageously also the case that certain limit conditions in the form of upper and lower limit values for smooth operation of the heat pump system are taken into consideration in the characteristic curves. The characteristic curves are then determined in particular by means of suitable tests, and suitably stored in the form of a value table or a calculation rule in the memory of the control system.

The control system suitably has control electronics or a controller for performing in particular one or more of the abovementioned settings, control actions, regulation actions, calculations and/or other operations.

By means of the control system, the heat pump system of the vehicle then operates particularly reliably, robustly, efficiently and quietly overall. By means of the control system, it is furthermore advantageously also possible to realize complex air-conditioning demands such as for example simultaneous heating of the passenger compartment and cooling of vehicle components in the cooling circuit and/or by means of further evaporators in the refrigeration circuit. In relation to conventional heat pump systems, the heat pump system is particularly energy-efficient, and therefore suitable in particular for use in an electric or hybrid vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
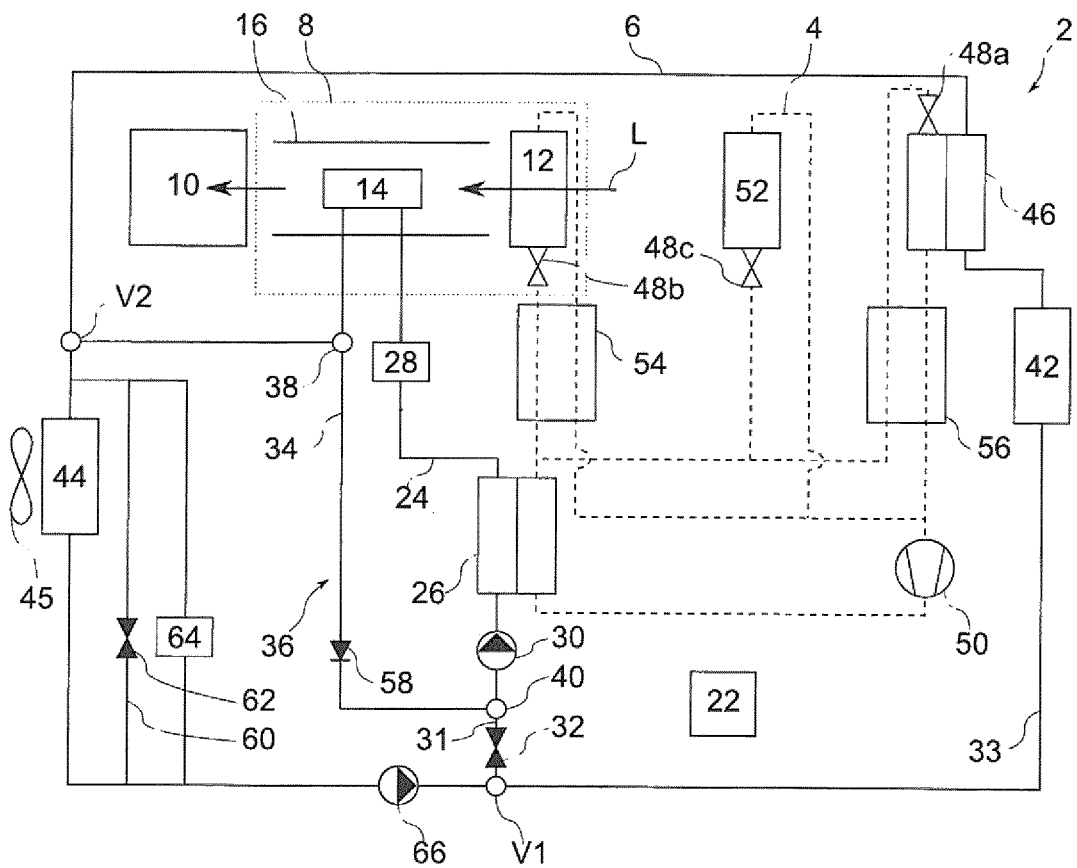
FIG. 1 shows a heat pump system.

FIG. 1 illustrates a heat pump system 2 for a vehicle (not shown in any more detail), in particular for an electric or a hybrid vehicle. The heat pump system 2 has a refrigeration circuit 4, in which a refrigerant circulates, and a coolant circuit 6, in which a coolant, for example a water-glycol mixture, circulates. The refrigeration circuit 4 is illustrated in FIG. 1 by a dashed line, and the coolant circuit 6 is illustrated by a solid line. The coolant circuit 6 is a cooling circuit in which the coolant normally has a temperature between approximately −25 and +70° C., or even up to +90° C. The heat pump system 2 furthermore has an air-conditioning unit 8 for the air-conditioning of a passenger compartment 10, that is to say of an interior compartment, of the vehicle. For this purpose, the air-conditioning unit 8 has an air-conditioning evaporator 12, which is connected to the refrigeration circuit 4, and a heating heat exchanger 14, which is connected to the coolant circuit 6. The air-conditioning evaporator 12 then serves for the cooling and dehumidification of the passenger compartment 10, and the heating heat exchanger 14 serves for heating purposes.

The air-conditioning unit 8 furthermore comprises an air duct 16 for conducting air L into the passenger compartment 10. Here, the heating heat exchanger 14 is, in relation to the inflowing air L, arranged downstream of the air-conditioning evaporator 12, such that the air L is heated, cooled, or both, depending on the operation of the two components.

The heat pump system 2 is switchable by means of a control system 22 firstly between a heating mode and a cooling mode. Here, in the heating mode, heating of the passenger compartment 10 is realized by means of the heating heat exchanger 14, whereas in the cooling mode, cooling and dehumidification of the passenger compartment 10 is performed by means of the air-conditioning evaporator 12. The heat used for heating purposes is supplied to the heating heat exchanger 14 by means of the coolant circuit 6. For this purpose, the heating heat exchanger 14 is connected, in a heating branch 24, to the coolant circuit 6. In said heating branch 24 there is likewise connected a condenser 26 for the purposes of transferring heat from the refrigeration circuit 4 into the coolant circuit 6. The condenser 26 is formed as a water-cooled condenser with a suitable heat exchanger which is connected to the coolant circuit 6. In the exemplary embodiment shown here, as a further heat source, an auxiliary heater 28 is additionally arranged in the heating branch 24, specifically upstream of the heating heat exchanger 14 and downstream of the condenser 26. Furthermore, a heating circuit pump 30 is arranged in the heating branch 24, specifically upstream of the condenser 26 in the exemplary embodiment shown here, for the purposes of conveying coolant. Other positions are however basically also suitable.

In FIG. 1, the coolant circuit 6 comprises three sections, which are connected to one another at two branching points V1, V2. A low-temperature cooler 44 is arranged on a first section. The second section is the heating branch 24 with a feed line 31 and with a return line which is not designated in any more detail. The third section is a cooling branch 33. One of the branching points V1, V2 is then arranged, as first branching point V1, downstream of the first section. The feed line 31 of the heating branch 24 and the cooling branch 33 begin at said first branching point V1. Downstream of the two branches 24, 33, these are merged, and open jointly into the first section, at the other of the two branching points V1, V2 as second branching point V2.

In order for the heat introduced by the condenser 26 into the heating branch 24 to be optimally used for the heating of the passenger compartment 10, the heating branch 24 can be shut off by means of a shut-off valve 32. For this purpose, the shut-off valve 32 is in this case arranged in the feed line 31 of the heating branch 24. Furthermore, by means of a return branch 34, a heating loop 36 is formed by means of which coolant is recirculated from a first junction 38 downstream of the heating heat exchanger 14 to a second junction 40 of the heating branch 24 upstream of the condenser 26. The heating branch 24 extends between the first junction 38 and the second junction 40. The feed line 31 of the heating branch 24 is arranged upstream of the second junction 40 and downstream of the first branching point V1. The feed line 31 of the heating branch 24 can be shut off by means of the shut-off valve 32, such that the heating loop 36 can be operated substantially independently of the rest of the coolant circuit 6. Then, in the heating mode, the heating branch 24 is correspondingly shut off by means of the shut-off valve 32, such that the coolant in the heating loop 36 is conducted repeatedly via the condenser 26, the auxiliary heater 28 and the heating heat exchanger 14.

In parallel with respect to the heating branch 24, the coolant circuit 6 has the cooling branch 33 for the cooling of at least one vehicle component 42 of the vehicle. In the exemplary embodiment shown here, without restricting the general nature, only one vehicle component 42 is shown. Accordingly, embodiments with multiple vehicle components 42 can basically also be considered. The heat absorbed by means of the vehicle component 42 is either dissipated by means of the low-temperature cooler 44 in the coolant circuit 6 to the surroundings of the vehicle or is transferred by means of a chiller 46 into the refrigeration circuit 4. For the dissipation of heat by means of the low-temperature cooler 44, the latter is assigned a fan 45 which is formed in particular as an electric fan 44, that is to say as a so-called E-fan, and which conveys ambient air across the low-temperature cooler 44. For the transfer of heat into the refrigeration circuit 4, the chiller 46 is connected into the cooling branch 33 in particular downstream of the vehicle component 42. Furthermore, the chiller 46 has a chiller evaporator by means of which the chiller 46 is connected to the refrigeration circuit 4. In combination with the condenser 26, the chiller 46 forms in particular a heat pump for transferring heat from the cooling branch 33 into the heating branch 24. Furthermore, it is additionally or alternatively also possible for heat to be extracted from the surroundings by means of the low-temperature cooler 44 and then used by means of the chiller 46 and condenser 26 for the purposes of heating the passenger compartment 10.

In the refrigeration circuit 4, an expansion valve 48a is connected upstream of the chiller 46. Likewise, an expansion valve 48b is connected upstream of the air-conditioning evaporator 12. Furthermore, a compressor 50 is arranged in the refrigeration circuit 4, specifically upstream of the condenser 26.

The chiller 46 and the air-conditioning evaporator 12 are arranged in parallel with respect to one another in the refrigeration circuit 4. In the exemplary embodiment shown here, it is furthermore additionally the case that a further evaporator 52 is connected to the refrigeration circuit 4 in parallel with respect to the air-conditioning evaporator 12 and the chiller 46. Said further evaporator 52 serves for example for the cooling of a high-voltage battery (not shown in any more detail) of the vehicle. The further evaporator 52 is also assigned an expansion valve 48c.

Furthermore, in the exemplary embodiment shown here, two inner heat exchangers 54 and 56 are connected to the refrigeration circuit 4. Here, the inner heat exchanger 54 serves for increasing the power and efficiency of the air-conditioning evaporator 12, and the further inner heat exchanger 56 correspondingly serves for increasing the power and efficiency of the chiller 46. By contrast, in an alternative which is not shown, only one inner heat exchanger 54 is provided in the refrigeration circuit 4, which inner heat exchanger is then used jointly for the air-conditioning evaporator 12 and the chiller 46.

Owing to the special circuit configuration of the heat pump system 2, it is possible in said heat pump system to realize multiple operating modes BM for the optimum air-conditioning of the vehicle. The different operating modes BM are set by means of the control system 22 through control of the individual components of the heat pump system 2, specifically through control and/or regulation of the shut-off valve 32, of the expansion valve 48a upstream of the chiller 46, of the compressor 50, of the bypass valve 62, and of a fan 45 for controlling the air throughput at the low-temperature cooler 44. Said components are in particular control elements of the control system 22. Here, the special circuit configuration of the heat pump system 2 permits an automatic and in particular also flowing or continuous transition between the various operating modes BM, wherein a respective transition occurs particularly quietly, requires only a minimal number of switching processes, and in particular requires no waiting times and direction reversals. As a result, the heat system 2 is particularly stable, quiet and efficient during operation.

On the basis of FIGS. 2 to 7, various control and regulation concepts for the abovementioned components will be described below, and in this context, the various operating modes BM for addressing different air-conditioning demands will also be discussed in more detail. Said control and regulation concepts are implemented and executed by means of the control system 22. The corresponding parts and components for the specific implementation of the concepts are then in each case in particular a part of the control system 22.

The heat pump system 2 that is shown basically has a cooling mode, also referred to as summer mode, a heating mode, also referred to as winter mode, and multiple mixed modes as transition modes between the cooling mode and the heating mode. Combined heating and cooling is then realized in said mixed modes. In a first mixed mode, it is firstly the case that, proceeding from the heating mode, the air-conditioning evaporator 12 is switched in. In a second mixed mode, it is then the case that, proceeding from the first mixed mode, the heating power is reduced by virtue of the power of the chiller 46 and thus of the heat pump being reduced. In a third mixed mode, it is then the case that, proceeding from the second mixed mode, the shut-off valve is operated in clocked fashion in order to dissipate excess heat from the heating branch 24. Proceeding from the third mixed mode, the cooling mode is then attained by virtue of the shut-off valve 32 being permanently opened.

In general, only ever one of the abovementioned operating modes BM is active, that is to say only ever one particular operating mode BM is set at a given point in time. This is in particular owing to the fact that the operating modes BM are defined inter alia by the switching positions of the various control elements of the control system 22, and are therefore mutually exclusive. In the exemplary embodiment shown here, in addition to the operating modes BM, a heat store configuration WS and a low-temperature heating configuration NTH can also be set as additional configurations of the heat pump system 2, which can also be set at the same time as one or more of the mentioned operating modes BM. In particular, the low-temperature heating mode can be set at the same time as one of the mixed modes or at the same time as the heating mode, and also automatically activates the heat store mode, such that said two operating modes BM are then active simultaneously.

Figure 2:
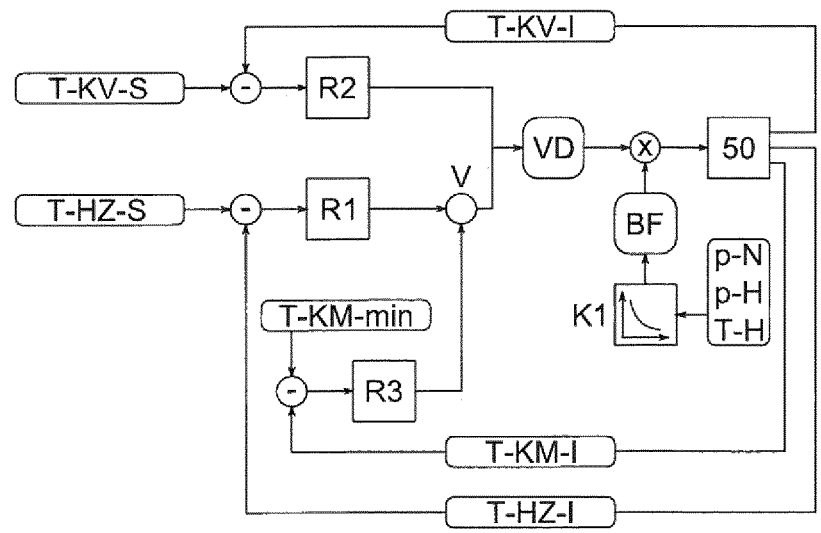
FIG. 2 shows a regulation concept for a compressor of the heat pump system.

FIG. 2 shows a regulation concept for the compressor 50, also referred to as electrical refrigerant compressor, or for short as EKMV. The control variable is in this case a rotational speed of the compressor 50, that is to say a compressor rotational speed VD, which significantly determines the power imparted by the compressor 50 and thus indirectly an air-conditioning power of the air-conditioning evaporator 12 and of the heat pump, that is to say in particular of the chiller 46. The regulation is basically performed firstly by means of a first and a second regulator R1, R2, wherein the output of only one of the regulators R1, R2 is selected, and then used, in a manner dependent on the ambient conditions and/or the air-conditioning demand. In the case of a pure heating demand, that is to say for the heating mode, regulation is performed by means of the first regulator R1, wherein the regulating variable is then a heating branch actual temperature T-HZ-I, that is to say a temperature of the coolant in the heating branch, specifically preferably measured between the condenser 26 and the heating heat exchanger 14. The temperature of the coolant at this location determines the heating power of the heating heat exchanger 14 and thus the heating of the passenger compartment 10. To attain a particular temperature of the passenger compartment 10, which is for example predefined by the user by means of an operating element or predefined by a superordinate air-conditioning function logic, it is then necessary for the coolant at the heating heat exchanger 14 to have a particular heating branch setpoint temperature T-HZ-S, which is used as reference variable for the first regulator R1, which is also referred to as heating regulator R1.

For the cooling mode and the mixed modes, that is to say for those operating modes BM for which the air-conditioning evaporator 12 is activated and used for absorption of heat, it is by contrast the case that regulation is performed by means of the second regulator R2, also referred to as cooling regulator R2, in a manner dependent on an evaporator actual temperature T-KV-I, that is to say the temperature of the air that flows over the air-conditioning evaporator 12 for cooling purposes. The reference variable is then an evaporator setpoint temperature T-KV-S, which is for example set and predefined by the user or predefined by a superordinate air-conditioning function logic. Here, it must be ensured that, specifically even in the mixed modes in which a heating demand in the form of the heating branch setpoint temperature T-HZ-S is also present at the same time as a cooling demand in the form of the evaporator setpoint temperature T-KV-S, the regulation of the compressor 50 is performed in a manner dependent on the cooling demand. Only in the heating mode is the regulation performed by means of the first regulator R1.

A significant peculiarity of the control and regulation, proposed here, of the heat pump system 2 by means of the control system 22 is an additional regulating loop with a third regulator R3, for the regulation of the compressor 50 in a manner dependent on a temperature of the coolant outside the heating branch 24 and in particular on a temperature of the coolant downstream of the chiller 46 and upstream of the low-temperature cooler 44. By means of this additional regulating loop, icing of the low-temperature cooler 44, owing to coolant that has been excessively cooled in the chiller 46, is efficiently avoided by virtue of the compressor rotational speed VD being reduced in good time. For this purpose, the temperature of the coolant as a coolant actual temperature T-KM-I is supplied as regulating variable, and a minimum coolant temperature T-KM-min, in the context of a lower limit value which should not be undershot in order to avoid icing, is supplied as reference variable, to the third regulator R3. The third regulator R3 is therefore also referred to as limitation regulator R3. A special feature of the regulation concept for the compressor 50 is then the selection of one of the two control variables of the first regulator R1 and of the third regulator R3, specifically either the operating-mode-dependent control variable of the first regulator R1 or the control variable of the third regulator R3. Specifically, the selection is performed by means of a comparator V, which performs a minimum comparison and sets the lower of the two compressor rotational speeds VD. Here, the comparison is performed only between the first regulator R1 and the third regulator R3, that is to say only if a pure heating demand is present and, owing to a correspondingly high compressor power for addressing this heating demand, the risk of icing is at its greatest. If the compressor 50 is regulated by means of the second regulator R2, no limitation is performed by means of the comparator V. Altogether, therefore, an operating-mode-dependent selection is made between the first regulator R1 and the second regulator R2, and in the case of the first regulator R1 being selected, an additional limitation is performed by means of the comparator V and the third regulator R3.

In addition to the abovementioned regulators R1, R2, R3, the regulation concept of FIG. 2 comprises a limitation which is implemented by multiplication of the control variable, that is to say in this case of the regulator output in particular downstream of the comparator, with a limitation factor BF. This mechanism ensures that a minimum low pressure p-N upstream of the compressor 50 is not undershot, a maximum high pressure p-H downstream of the compressor 50 is not overshot, and a maximum hot-gas temperature T-H of the refrigerant downstream of the compressor 50 is not overshot. For each of the stated cases, a limitation factor BF for the value to be limited is determined by means of a respective characteristic curve K1 and is multiplied by the control variable.

Figure 3A:
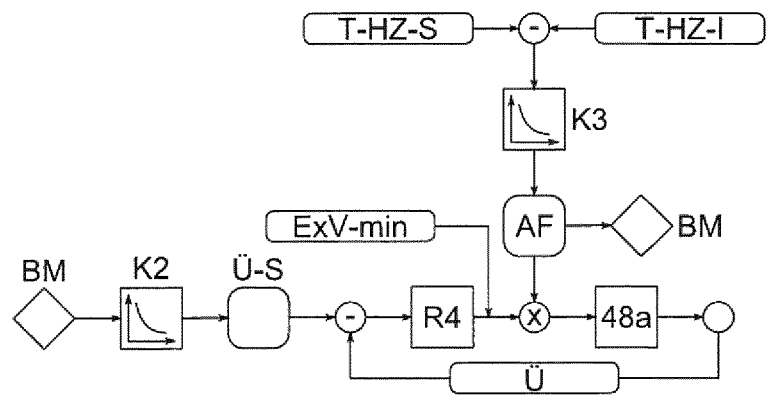
FIG. 3A shows a regulation concept for an expansion valve of a heat pump of the heat pump system.

FIG. 3A shows a regulation concept for the expansion valve 48a which is arranged upstream of the chiller 46. Said expansion valve 48a serves substantially for setting a particular degree of superheating Ü of the refrigerant upstream of the compressor 50, and thus ultimately for setting the power of the heat pump. The degree of superheating Ü specifies the difference between a refrigerant actual temperature T-KM-I upstream of the compressor 50 and a pressure-dependent saturated steam temperature of the refrigerant. The degree of superheating Ü is normally specified in Kelvin, and amounts for example to between 2 and 15 K.

In the regulation concept of FIG. 3A, the regulation is performed by means of a fourth regulator R4, which is also referred to as superheating regulator R4. The degree of superheating Ü is in this case the regulating variable, and the manipulated variable is then a degree of opening or an opening extent of the expansion valve 48a. Here, the temperature and the pressure of the refrigerant upstream of the compressor 50 are measured, and from this, the present degree of superheating Ü, that is to say the actual degree of superheating, is determined, in a manner not illustrated, by means of a characteristic curve. To avoid an excessively frequent adjustment, rapid changes in the temperature are absorbed by virtue of the measured temperature being temporally filtered, that is to say smoothed, whereby in particular the inertia of a TxV, that is to say of a thermal expansion valve, is simulated. As a reference variable, a setpoint degree of superheating Ü-S is provided, which is determined by means of a characteristic curve K2 in a manner dependent on the respective operating mode BM. Basically, a constant value is initially also suitable, but in the first mixed mode in particular, an adaptation of the degree of superheating Ü is advantageous in order to realize more efficient operation.

Since, as described above, the compressor 50 is regulated by means of the difference between evaporator actual temperature T-KV-I and evaporator setpoint temperature T-KV-S in the mixed modes, the power of the compressor 50 is correspondingly divided between the air-conditioning evaporator 12 and the chiller of the heat pump, such that, in the first mixed mode, under some circumstances, the demanded amount of heat does not pass into the heating branch 24, and additional heating must be imparted by means of the auxiliary heater 28. To avoid this as far as possible, or in order to even omit the auxiliary heater 28 entirely, it is thus the case that a lower setpoint degree of superheating Ü-S is set in the first mixed mode than in other operating modes BM, whereby the degree of opening of the expansion valve 48a is set to a correspondingly greater value and generates a greater refrigerant mass flow through the chiller 46, whereas a reduced refrigerant mass flow passes through the air-conditioning evaporator 12. Owing to the regulation of the compressor 50 relative to the air-conditioning evaporator 12, it is then the case that the power of the compressor 50 is automatically increased, such that in turn, it is also the case that more heat is transferred by means of the heat pump into the heating branch. Through adaptation of the setpoint degree of superheating Ü-S in a manner dependent on the operating mode BM, it is then the case in the first mixed mode that trimming of the air-conditioning evaporator 12 and of the chiller 46 is realized, and a higher compressor power is forced in relation to that which would be required solely on the basis of the evaporator temperature. Said additional compressor power is then used for the additional supply of heat into the heating branch 24 by means of the heat pump, such that the auxiliary heater 28, which is inefficient in comparison to this, initially does not need to be activated.

A further special feature of the regulation concept shown in FIG. 3A is the additional influencing of the control variable output by the fourth regulator R4 by means of an additional throttling-down factor AF, which is simultaneously significantly involved in the definition of the various operating modes BM. The throttling-down factor AF serves substantially for realizing a reduction of the power transferred by the heat pump, and thus for the setting of the second mixed mode. Since, in said second mixed mode, in comparison with the heating mode and in comparison with the first mixed mode, only a relatively small amount of heat is required in the heating branch 24, the power of the heat pump is reduced as a result of additional throttling-down of the expansion valve 48a, and it is thus then the case that less heat is transferred from the refrigeration circuit 4 into the heating branch 24. As a result, an unnecessarily large amount of heat, which does not correspond to demand, in the heating branch 24 is avoided, and the efficiency of the heat pump system 2 is improved overall.

In the example shown, the throttling-down factor AF is as a factor in the range from 0 to 1 in a manner dependent on the heating branch actual temperature T-HZ-I already mentioned above, more specifically in a manner dependent on the difference between the heating branch setpoint temperature T-HZ-S and the heating branch actual temperature T-HZ-I. Here, the difference is used for determining a suitable value of the throttling-down factor AF on the basis of a characteristic curve K3.

Figure 3B:
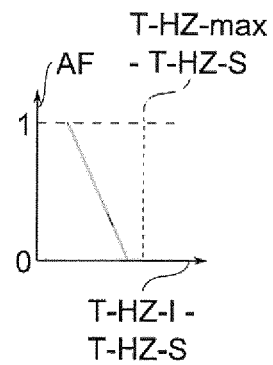
FIG. 3B shows a characteristic curve for the determination of a throttling-down factor for the regulation concept from FIG. 3A.

An example for said characteristic curve K3 is shown in FIG. 3B, which shows the throttling-down factor AF as a function of the abovementioned difference. With increasing heating branch actual temperature T-HZ-I, the throttling-down factor AF is selected to be smaller, such that the expansion valve 48a is closed to a greater extent, and in the process, the power of the chiller 46 is reduced exactly to the required extent. By means of this additional intervention into the regulation by means of the fourth regulator R4, the degree of superheating Ü is also increased, which in this situation should however be accepted. Therefore, for the second mixed mode, that is to say in the case of a throttling-down factor between 0 and 1, at least the I component of the fourth regulator R4, and in one variant also the P component, is stopped, such that the fourth regulator R4 is prevented from counteracting the additional intervention by means of the throttling-down factor AF.

As a result of the value 0 for the throttling-down factor AF being reached, the heat pump system 2 is automatically switched into the third mixed mode. The expansion valve 48a is then fully closed, and the heat pump is deactivated.

In the characteristic curve K3 for the throttling-down factor AF, it is furthermore taken into consideration that a maximum heating branch temperature T-HK-max should not be exceeded, that is to say the throttling-down factor AF amounts to 0 before or at the latest when the heating branch actual temperature T-HZ-I reaches the maximum heating branch temperature T-HK-max. In this way, a transfer of heat by means of the heat pump is then prevented when the maximum heating branch temperature T-HK-max is reached. Rather, in this case, the third mixed mode is set in that any excess heat is removed from the heating branch 24 by means of suitable clocked operation of the shut-off valve 32. The transition between the second and the third mixed mode is accordingly distinguished by the fact that the power of the heat pump can be reduced no further, but nevertheless excess heat is present in the heating branch, such that the heating branch 24 is now opened by means of the shut-off valve 32.

In situations in which the chiller 46 is not active, that is to say in particular in the third mixed mode, it is then also the case that the I component of the fourth regulator R4 is stopped in order, upon a renewed activation of the chiller 46, to prevent the fourth regulator R4 from moving the expansion valve 48a into a stop position, that is to say directly fully opening said expansion valve. In this way, in particular, unnecessary switching noises and an excessive acoustic burden on the surroundings are avoided.

For the low-temperature heating configuration NTH, too, the expansion valve 48a upstream of the chiller 46 is fully closed, because here, the heat used for heating purposes is extracted from the coolant circuit, and the heat pump is not required, whereby energy is correspondingly saved, which would otherwise be required for operating the compressor 50 for the purposes of heat transfer by means of the heat pump. In certain situations, complete closure of the expansion valve 48a upstream of the chiller 46 is however disadvantageous, such that, in such situations, the regulation is circumvented, and instead, a minimum degree of opening is set by virtue of a minimum value ExV-min as a lower limit value being used for the control variable. This approach is particularly expedient upon the starting of the heat pump system 2, that is to say in particular upon the starting of the vehicle, such that the minimum degree of opening is set already upon the shut-down of the vehicle in order to then be correspondingly set upon starting. Such an opened position in the case of an inactive heat pump system 2 and generally inactive vehicle furthermore permits a pressure equalization in the refrigeration circuit 4, such that noticeable pressure pulses and noises upon starting are avoided.

The setting of a minimum degree of opening is necessary in particular for the heating mode and in particular for the first mixed mode and generally for situations and operating modes BM in which, in addition to the expansion valve 48a upstream of the chiller 46, the expansion valve 48b upstream of the air-conditioning evaporator 12 is also used and open. In this situation, both expansion valves 48a, 48b, and basically in particular also the expansion valve 48c, jointly influence the degree of superheating Ü upstream of the compressor 50. Through specification of the minimum degree of opening, an excessive degree of closure of the expansion valve 48a upstream of the chiller 46 is then avoided. This has a particularly stabilizing effect on the operation of the heat pump system 2. In general, a minimum degree of opening is necessary in particular in order that a minimum mass flow flows through the chiller 46 in the first mixed mode regardless of the degree of superheating. This is based on the concept whereby, for example in the case of an open expansion valve 48b at the air-conditioning evaporator 12, and in the case of the degree of opening of the expansion valve 48a being set to be smaller than the minimum degree of opening, the degree of superheating Ü is under some circumstances even lower than the setpoint degree of superheating Ü-S owing to the influencing by the expansion valve 48b, and in this situation the expansion valve 48a would close yet further, whereby the mass flow through the chiller 46 would be reduced to 0. Without the minimum degree of opening, an absorption of heat would therefore not start in the first place.

Figure 4A:
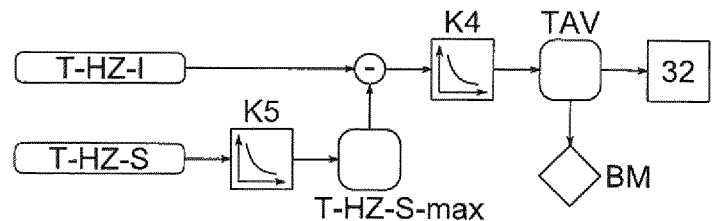
FIG. 4A shows a control concept for a shut-off valve of a heating branch of the heat pump system.

FIG. 4A shows a control concept for the shut-off valve 32, that is to say a concept for the automatic connection and separation of the heating branch 24 to and from the rest of the coolant circuit 6 in accordance with demand. The shut-off valve 32 is basically open for the cooling mode in order to realize an exchange of coolant and a dissipation of heat by means of the low-temperature cooler 44, whereas the shut-off valve 32 is permanently closed for the heating mode in order to retain as much heat as possible in the heating branch 24 and in the heating loop 36. The shut-off valve 32 is permanently closed also for realizing the first and the second mixed mode, in which in each case only the heating power by means of the absorption of heat at the chiller of the heat pump is reduced. Only in the event of an excessive accumulation of heat in the heating branch 24 is the shut-off valve 32 operated in clocked fashion and the third mixed mode thus set.

For this purpose, the shut-off valve 32 is controlled through specification of a clock signal TAV for the repeated opening and closing of the shut-off valve 32. Said shut-off valve is accordingly opened during a first time interval t-o, is subsequently closed during a second time interval t-g, wherein the two time intervals t-o and t-g added together then yield a period duration PD. This amounts to for example 3.6 s, and the two time intervals t-o and t-g then correspondingly have values between 0 and 3.6 s. The predefined clock signal TAV is for example the ratio of the first time interval t-o to the period duration PD. The clock signal TAV is determined by means of a characteristic curve K4 which links the clock signal TAV to be set with the temperature of the coolant in the heating branch 24. In the special control concept of FIG. 4A, the selection is performed on the basis of the characteristic curve K4 in a manner dependent on the difference between the heating branch actual temperature T-HZ-I and a maximum heating branch setpoint temperature T-HZ-S-max, which in turn is determined in a manner dependent on the heating branch setpoint temperature T-HZ-S by means of a characteristic curve K5.

Figure 4B:
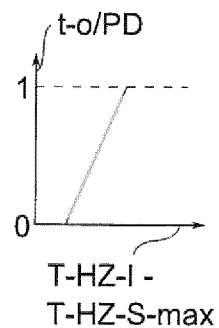
FIG. 4B shows a characteristic curve for the determination of a clock signal for the control concept from FIG. 4A.

The control system 22 thus controls the shut-off valve 32 in a manner dependent on the heating branch setpoint temperature T-HZ-S predefined by the user or by the superordinate air-conditioning function logic, and limits said control by means of a maximum temperature for the heating branch 24. For illustration, FIG. 4B shows an exemplary characteristic curve K4 for the determination of the clock signal TAV. In the case of a low heating branch actual temperature T-HZ-I, the shut-off valve 32 is held permanently closed by virtue of a clock signal TAV of 0 being selected here. In this way, heat is retained in the heating branch 24, and the heating mode or the first or second mixed mode is set. However, if there is the risk of the maximum heating branch setpoint temperature T-HZ-S-max being reached or exceeded, the shut-off valve 32 is operated in clocked fashion by virtue of a clock signal TAV between 0 and 1 being selected. Accordingly, the third mixed mode is automatically set if more heat than is required is present in the heating branch 24.

In the event of a further increase of the heating branch actual temperature T-HZ-I, the cooling mode is then set, and the shut-off valve 32 is permanently opened through the setting of a clock signal TAV of 1, in order to ensure a maximum dissipation of heat from the heating branch 24. The control of the shut-off valve 32 thus automatically sets the suitable clock signal TAV and ensures a continuous transition between the operating modes BM, in particular between the operating modes BM with a heating demand, that is to say in this case the heating mode and the first and second mixed modes, and the operating modes BM with a low or negligible heating demand in relation thereto, that is to say the third mixed mode and the cooling mode. Of particular importance here for an optimum transition is correspondingly suitable parameterization, that is to say configuration, of the characteristic curves K4, K5, for example through determination by means of a test series. In order furthermore to avoid a presence of the second and the third mixed mode simultaneously, and thereby improve the efficiency, the throttling-down factor AF in the second mixed mode and the first time interval t-o, that is to say the opening time, in the third mixed mode are coordinated with one another. It is important here in particular that the throttling-down factor AF is 0 as soon as the first time interval becomes greater than 0.

The dissipation of heat by means of the low-temperature cooler 44 is furthermore of integral importance for the heat pump system 2. Here, an unnecessary dissipation of heat should as far as possible be avoided. For this purpose, the coolant circuit 6 has a low-temperature cooler bypass 60 with a bypass valve 62 in parallel with respect to the low-temperature cooler 44. Here, the position of said bypass valve 62 defines a heat store configuration WS, wherein, when the bypass valve 62 is open, the heat store configuration WS is set, and no heat dissipation, or only a low level of heat dissipation, occurs by means of the low-temperature cooler 44. Instead, the coolant is conducted for the most part via the low-temperature cooler bypass 60. This configuration is expediently activated only if a heating demand is present and heat is to be supplied to the heating heat exchanger 14.

In an alternative which is not shown, instead of the bypass valve 62, a 3/2-way valve is used, or two shut-off valves are used, specifically such that, when the low-temperature cooler bypass 60 is open, the low-temperature cooler 44 is shut off, and then any coolant flow through the latter is prevented. This embodiment is in particular more efficient.

Figure 5:
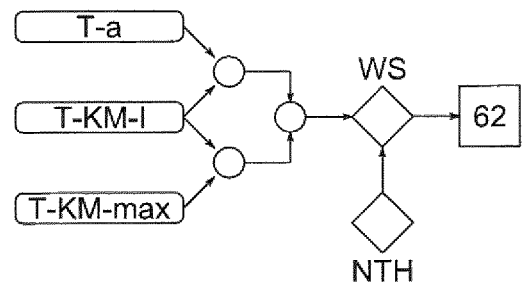
FIG. 5 shows a control concept for a bypass valve of the heat pump system.

Under certain ambient conditions, as are illustrated in FIG. 5, the heat contained in the coolant circuit 6 is then not released to the surroundings but supplied to the heating branch 24. For this purpose, the shut-off valve 32 must be correspondingly opened. As can be seen from FIG. 5, the setting of the heat store configuration WS is performed in a manner dependent on an outside temperature T-a, on the coolant actual temperature T-KM-I, and on a maximum coolant temperature T-KM-max. Here, the maximum coolant temperature T-KM-max constitutes an upper limit value for the temperature of the coolant, which should not be overshot in order to prevent excessive heating of the coolant as a result of a release of heat by means of the low-temperature cooler 44. The heat store configuration WS is activated if the coolant actual temperature T-KM-I is higher than the outside temperature T-a, such that it would at least potentially be possible for heat to be released to the surroundings, and if the coolant actual temperature T-KM-I is lower than the maximum coolant temperature T-KM-max. Correspondingly, in this case, the bypass valve 62 is switched over automatically.

As indicated in FIG. 5, the heat store configuration WS is also automatically activated if the low-temperature heating configuration NTH is active. In this configuration, the heating heat exchanger 14 is supplied with heat directly from the cooling branch 33 in a particularly efficient manner, without taking the indirect route via the heat pump. Instead, the coolant heated in the cooling branch 33 is conducted past the low-temperature cooler 44 in the heating branch 24, and thus the efficiency of the heat pump system 2 is considerably improved.

Figure 6:
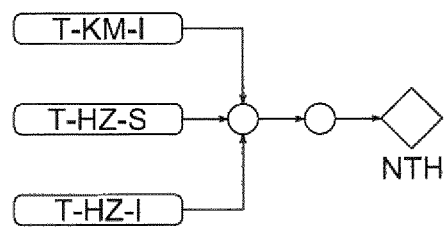
FIG. 6 shows conditions for the activation of a low-temperature heating configuration of the heat pump system.

The activation of the low-temperature heating configuration NTH is however subject to certain requirements, which are illustrated in more detail in FIG. 6. Accordingly, the control system 22 sets the low-temperature heating configuration NTH if the heating branch setpoint temperature T-HZ-S is lower than the coolant actual temperature T-KM-I and is higher than the heating branch actual temperature T-HZ-I. In other words: the heating demand is specifically such that a heating demand actually exists, and that the coolant has a higher temperature downstream of the chiller 46 than in the heating branch 24, that is to say a suitable heat potential is present, and the coolant releases heat at the heating heat exchanger 14. The lower limitation of the activation by means of the heating branch actual temperature T-HZ-I furthermore serves for preventing heat from being unnecessarily extracted from the heating branch 24 in the event of a change in the heating demand from the user toward a reduced heating demand, whereby the efficiency of the heat pump system 2 is in turn improved. If the low-temperature heating configuration is activated, the heating branch actual temperature may possibly exceed the heating branch setpoint temperature. However, as long as the coolant actual temperature is high enough, that is to say is in particular higher than the heating branch setpoint temperature, the low-temperature heating configuration remains activated.

In such situations in which the low-temperature cooler 44 is used for the exchange of heat with the surroundings, the exchange of heat is expediently adapted to the respective situation. Said exchange of heat is determined significantly by an air flow across the low-temperature cooler 44, that is to say an amount of ambient air that is conducted across the low-temperature cooler 44 by means of the fan 45 per unit of time. The fan 45 is in this case an electrically driven fan 45, also referred to as an E-fan, with an adjustable fan rotational speed LD, for the purposes of setting the air flow and thus a particular exchange of heat.

Figure 7:
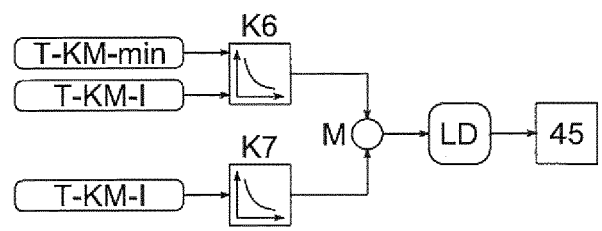
FIG. 7 shows a control concept for a fan of the heat pump system.

For an optimum exchange of heat with the surroundings in accordance with the situation, the fan rotational speed LD is, in the exemplary embodiment illustrated here, set in accordance with the control concept of FIG. 7. Accordingly, the fan rotational speed LD is selected by means of a characteristic curve K6 in a manner dependent on the coolant actual temperature T-KM-I and a minimum coolant temperature T-KM-min, and the fan 45 is actuated correspondingly by the control system 22. Here, the minimum coolant temperature T-KM-min denotes a lower limit value which prevents the coolant from being cooled at the low-temperature cooler 44 to such an extent that the low-temperature cooler ices up. For this purpose, the minimum coolant temperature T-KM-min is determined for example (in a manner not illustrated here) by means of a characteristic curve in a manner dependent on the outside temperature T-a, and in particular such that the minimum coolant temperature T-KM-min is at most insignificantly lower than the dew point of the ambient air in the present situation. Here, the minimum coolant temperature T-KM-min is normally lower than the outside temperature T-a.

The characteristic curve K6 is now configured such that the fan rotational speed LD is increased if the coolant actual temperature T-KM-I approaches the minimum coolant temperature T-KM-min, that is to say in the case of a decreasing difference between the two temperatures, in order to prevent icing of the low-temperature cooler through heating of the coolant. A further characteristic curve K7 is configured such that a higher fan rotational speed LD is set in the case of the dissipation of heat by means of the low-temperature cooler and in the case of increasing coolant actual temperature T-KM-I, in order for the correspondingly hotter coolant to be cooled more intensely in the low-temperature cooler. The selection of the fan rotational speed LD from the two characteristic curves K6, K7 is performed by means of a maximum selection M, that is to say the higher of the two fan rotational speeds LD is used. By contrast, in the heat store configuration WS, control of the fan 45 is omitted, and said fan is in particular deactivated entirely, because an exchange of heat with the surroundings is not required, and is not desired, in this situation. The air throughput is thus altogether controlled in a manner adapted to demand, and is thus particularly efficient. Only in the presence of corresponding demand is the fan rotational speed LD increased, such that, overall, improved acoustics of the heat pump system 2 are also realized by means of the control.

Altogether, the behavior of the control system 22 and thus of the heat pump system 2 is regulated and controlled significantly by the heating demand from the user or from a superordinate air-conditioning function logic, by means of the heating branch setpoint temperature T-HZ-S, by means of the refrigerant actual temperature T-KM-I as an expression of the heat within the heat pump system 2, and by means of the outside temperature T-a as an expression of the weather and the ambient conditions. The stated control and regulation concepts are in this case suitable in particular for the heat pump system 2 illustrated in FIG. 1, but are basically also transferable to other heat pump systems 2 and to expansions of said heat pump system to include, for example, a coolant-cooled high-voltage battery cooling arrangement.

LIST OF REFERENCE DESIGNATIONS

2 Heat pump system
4 Refrigeration circuit
6 Coolant circuit
8 Air-conditioning unit
10 Passenger compartment
12 Air-conditioning evaporator
14 Heating heat exchanger
16 Air duct
22 Control system
24 Heating branch
26 Condenser
28 Auxiliary heater
30 Heating circuit pump
31 Feed line (of the heating branch)
32 Shut-off valve
33 Cooling branch
34 Return branch
36 Heating loop
38 First junction
40 Second junction
42 Vehicle component
44 Low-temperature cooler
45 Fan
46 Chiller
48a, 48b, 48c Expansion valve
50 Compressor
52 Further evaporator
54 Inner heat exchanger
56 Further inner heat exchanger
58 Check valve
60 Low-temperature cooler bypass
62 Bypass valve
64 Expansion tank
66 Pump
AF Throttling-down factor
BF Limitation factor
BM Operating mode
ExV-min Minimum value
K1, K2, K3, K4, K5, K6, K7 Characteristic curve
L Air
LD Fan rotational speed
M Maximum selection
NTH Low-temperature heating configuration
PD Period duration
p-H Maximum high pressure
p-N Minimum low pressure
R1 First regulator, heating regulator
R2 Second regulator, cooling regulator
R3 Third regulator, limitation regulator
R4 Fourth regulator, superheating regulator
T-a Outside temperature
TAV Clock signal
T-H Maximum hot-gas temperature
T-HZ-I Heating branch actual temperature
T-HZ-S Heating branch setpoint temperature
T-HZ-S-max Maximum heating branch setpoint temperature
T-KM-I Coolant actual temperature
T-KM-max Maximum coolant temperature
T-KM-min Minimum coolant temperature
T-KV-I Evaporator actual temperature
T-KV-S Evaporator setpoint temperature
t-o First time interval
t-g Second time interval
V Comparator
VD Compressor rotational speed
V1 First branching point
V2 Second branching point
WS Heat store configuration
Ü Degree of superheating
Ü-S Setpoint degree of superheating The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a control system for air-conditioning a vehicle, the method comprising the steps of:
automatically setting one of several operating modes in a manner dependent on an air-conditioning demand for a passenger compartment of the vehicle;
cooling the passenger compartment by an air-conditioning evaporator in response to the air-conditioning demand comprising a cooling or dehumidification demand;
heating the passenger compartment by a heating heat exchanger in response to the air-conditioning demand comprising a heating demand, wherein the heating heat exchanger is arranged in a heating branch of a coolant circuit, wherein the heating heat exchanger is supplied with heated coolant via a heat pump, and wherein the heating branch has a chiller and a condenser which are both connected to a refrigeration circuit, and wherein the chiller is arranged in a cooling branch of the coolant circuit and the condenser is arranged in the heating branch;

operating the heating branch and deactivating the chiller of the heat pump, to achieve a cooling mode, in response to a cooling demand without an additional heating demand;

closing the heating branch such that heat is supplied to the heating heat exchanger by: the condenser of the heat pump, the cooling branch and/or absorption of heat by a low-temperature cooler, to achieve a heating mode; and dissipating heat from the heating branch by opening the heating branch, and operating the low-temperature cooler, the condenser and the heating heat exchanger in a manner connected in series.

2. The method as claimed in claim 1, wherein proceeding from the heating mode, a first mixed mode is set by the air-conditioning evaporator being activated, proceeding from the first mixed mode, a second mixed mode is set by the heating power being reduced by an expansion valve, which is connected upstream of the chiller in the refrigeration circuit, being throttled down, proceeding from the second mixed mode, a third mixed mode is set by the heating branch being operated in clocked fashion, proceeding from the third mixed mode, the cooling mode is set by the heating branch being opened and maintained as opened while the third mixed mode is set.

3. The method as claimed in claim 1, wherein said control system regulates a power of a compressor and has a first regulator and a second regulator that regulate the power of the compressor, by which a compressor rotational speed of the compressor is set, wherein the respectively set compressor rotational speed serves as a first control variable for the first regulator and as a second control variable for the second regulator, wherein only one of the two regulators and the control variable thereof are selected, in a manner dependent on the air-conditioning demand, for the regulation of the compressor.

4. The method as claimed in claim 3, wherein in the heating mode, the compressor is regulated by the first regulator, wherein a heating branch actual temperature is used as a regulating variable, and a heating branch setpoint temperature is used as a reference variable.

5. The method as claimed in claim 3, wherein in response to the cooling demand, the compressor is regulated by the second regulator in a manner dependent on an evaporator actual temperature as a regulating variable, and an evaporator setpoint temperature is used as reference variable.

6. The method as claimed in claim 3, wherein said control system has a third regulator, by which the compressor is regulated based on a coolant actual temperature as a regulating variable, and a minimum coolant temperature as a reference variable, being supplied to the third regulator, and wherein the third regulator regulates the power of the compressor, by which the compressor rotational speed of the compressor is set, the set compressor rotational speed serving as a third control variable.

7. The method as claimed in claim 6, wherein said control system selects one control variable out of the first control variable and a third control variable by a comparator, wherein the comparator performs a comparison and selects the lower of the first control variable and the third control variable for the regulation of the compressor.

8. The method as claimed in claim 7, wherein said control system has a superheating regulator, by which a degree of superheating of the refrigerant is set through regulation of an expansion valve which is arranged upstream of the chiller and which has an opening which serves as a manipulated variable of the superheating regulator, wherein the degree of superheating serves as a regulating variable of the superheating regulator and a setpoint degree of superheating serves as a reference variable, which is determined in a manner dependent on the air-conditioning demand.

9. The method as claimed in claim 8, wherein for a first mixed mode, the setpoint degree of superheating is set to be lower than in the heating mode.

10. The method as claimed in claim 9, wherein the manipulated variable of the fourth regulator is influenced by an additional throttling-down factor, which reflects a throttling down of the expansion valve, thereby reducing the amount of heat transferred by the heat pump.

11. The method as claimed in claim 9, wherein a reduction of the absorption of heat is achieved via the setpoint degree of superheating being modified with an additional throttling-down supplement.

12. The method as claimed in claim 11, wherein in the case of a reduction of the control variable by the throttling-down factor, an I component of the superheating regulator is stopped.

13. The method as claimed in claim 12, wherein, in response to a limit value for the throttling-down factor being reached, the expansion valve is fully closed, and a third mixed mode is automatically set via the heating branch being operated in a clocked fashion.

14. The method as claimed in claim 8, wherein upon shut-down of the vehicle or in response to both the chiller and the air-conditioning evaporator being active, a minimum degree of opening is predefined for the expansion valve upstream of the chiller, which minimum degree of opening limits the manipulated variable of the superheating regulator.

15. The method as claimed in claim 13, wherein said control system opens and closes the heating branch by a shut-off valve, wherein, for the opening of the heating branch, the shut-off valve is opened, for the closure of the heating branch, the shut-off valve is closed, and the third mixed mode is set via the shut-off valve being periodically opened and closed.

16. The method as claimed in claim 1, wherein said control system sets a low-temperature heating configuration via the heat pump being deactivated and waste heat of a vehicle component which is connected to the cooling branch being used for heating purposes.

17. The method as claimed in claim 16, wherein the low-temperature heating configuration is activated only in response to a heating branch setpoint temperature being lower than a coolant actual temperature and not lower than a heating branch actual temperature.

18. The method as claimed in claim 1, wherein said control system sets a heat store configuration via the coolant being conducted past the low-temperature cooler via a low-temperature cooler bypass.

19. The method as claimed in claim 18, wherein the heat store configuration is automatically set in response to a coolant actual temperature being higher than an outside temperature and the coolant actual temperature being lower than a maximum coolant temperature.

20. The method as claimed in claim 19, wherein said control system automatically activates the heat store configuration in response to more heat being generated in the cooling branch than transferred into the refrigeration circuit by the chiller.

21. The method as claimed in claim 1, wherein the low-temperature cooler is assigned a fan, having an adjustable fan rotational speed, and wherein the fan is actuated via the fan rotational speed being set in a manner dependent on a coolant actual temperature and on a minimum coolant temperature.

22. The method as claimed in claim 21, wherein the fan rotational speed is determined by a characteristic curve which is configured such that the fan rotational speed is increased in response to a coolant actual temperature approaching a minimum coolant temperature.

23. The method as claimed in claim 22, wherein the fan rotational speed is determined by a characteristic curve which is configured such that a higher fan rotational speed is set in response to a dissipation of heat by the low-temperature cooler and in response to increasing coolant actual temperature.

24. The method as claimed in claim 23, wherein the fan rotational speed is determined via in each case one fan rotational speed being determined by the two characteristic curves, and the higher of said two fan rotational speeds being selected and set by a maximum selection.

25. The method as claimed in claim 1, wherein icing of the low-temperature cooler is avoided via the heating branch being cyclically opened, and heat being conducted from the heating branch to the low-temperature cooler.

* * * * *